United States Patent
Gray

(10) Patent No.: US 6,597,526 B1
(45) Date of Patent: Jul. 22, 2003

(54) MAGNETIC TAPE DRIVE APPARATUS INCLUDING A VARIABLE RATE ENCODER

(75) Inventor: Martin D. Gray, La Jolla, CA (US)

(73) Assignee: Overland Storage, Inc., San Diego, CA (US)

(*) Notice: Subject to any disclaimer, the term of this patent is extended or adjusted under 35 U.S.C. 154(b) by 0 days.

(21) Appl. No.: 09/134,243

(22) Filed: Aug. 14, 1998

(51) Int. Cl.$^7$ .................................. G11B 5/09
(52) U.S. Cl. ............................ 360/40; 360/51
(58) Field of Search ..................... 360/8, 39, 40, 360/48, 51

(56) References Cited

U.S. PATENT DOCUMENTS

| | | |
|---|---|---|
| 3,689,899 A | 9/1972 | Franaszek |
| 4,435,826 A | 3/1984 | Matsui |
| 4,559,568 A | 12/1985 | Watanabe et al. |
| 4,644,564 A | 2/1987 | Dolivo et al. |
| 4,680,791 A | 7/1987 | Kato et al. |
| 4,731,676 A | 3/1988 | Berlekamp |
| 4,736,377 A | 4/1988 | Bradley et al. |
| 4,744,082 A | 5/1988 | Fujimura et al. |
| 4,779,275 A | 10/1988 | Yoshimoto |
| 4,862,457 A | 8/1989 | Morimoto |
| 4,884,147 A * | 11/1989 | Arimoto et al. ............ 358/443 |
| 4,907,225 A | 3/1990 | Gulick et al. |
| 4,908,826 A | 3/1990 | Hertrich |
| 4,945,538 A | 7/1990 | Patel |
| 4,975,930 A | 12/1990 | Shaw |
| 4,978,955 A | 12/1990 | Howell |
| 4,993,029 A | 2/1991 | Galbraith et al. |
| 5,014,274 A | 5/1991 | Higurashi et al. |
| 5,068,878 A | 11/1991 | Lin et al. |
| 5,109,385 A | 4/1992 | Karp et al. |
| 5,172,381 A | 12/1992 | Karp et al. |
| 5,220,466 A | 6/1993 | Coker et al. |
| 5,222,139 A | 6/1993 | Takaragi et al. |
| 5,255,131 A | 10/1993 | Coker et al. |
| 5,258,933 A | 11/1993 | Johnson et al. |
| 5,263,054 A | 11/1993 | Davis et al. |
| 5,274,569 A | 12/1993 | Prasad |
| 5,321,559 A | 6/1994 | Nguyen et al. |

(List continued on next page.)

FOREIGN PATENT DOCUMENTS

| | | |
|---|---|---|
| EP | 0 310 057 A2 | 4/1989 |
| EP | 0347 934 A2 | 12/1989 |
| EP | 0 507 196 A2 | 10/1992 |
| EP | 0 511 498 A2 | 11/1992 |
| EP | 0 343 930 B1 | 4/1994 |
| EP | 0 593 173 A2 | 4/1994 |
| EP | 0507196 B1 | 6/1999 |
| GB | 2 286 952 A | 8/1995 |
| JP | 06124451 | 5/1994 |
| JP | 07111047 | 4/1995 |
| JP | 10013249 A * | 1/1998 |
| WO | WO 87/06086 | 10/1987 |
| WO | WO 93/10534 | 5/1993 |
| WO | WO 94/07332 | 3/1994 |
| WO | WO 97/29486 | 8/1997 |

OTHER PUBLICATIONS

Price, R., et al., "An Experimental, Multilevel, High Density Disk Recording System," IEEE Transactions On Magnetics, vol. Mag–14, No. 5, Sep. 1978, pp. 315–317.

*Primary Examiner*—Regina N. Holder
(74) *Attorney, Agent, or Firm*—Knobbe Martens Olson & Bear, LLP

(57) ABSTRACT

The present invention comprises a magnetic recording system including a partial response, maximum likelihood recording channel incorporating fixed frequency read signal sampling and a digital timing control loop. Such a system is especially suitable in magnetic tape recording systems having a high degree of media speed variation during the read and write processes.

6 Claims, 19 Drawing Sheets

U.S. PATENT DOCUMENTS

| | | |
|---|---|---|
| 5,341,387 A | 8/1994 | Nguyen |
| 5,345,342 A | 9/1994 | Abbott et al. |
| 5,367,409 A | 11/1994 | Ottesen et al. |
| 5,375,145 A | 12/1994 | Abbott et al. |
| 5,387,910 A | 2/1995 | Medan et al. |
| 5,404,377 A | 4/1995 | Moses |
| 5,420,893 A | 5/1995 | Ward |
| 5,430,768 A | 7/1995 | Minuhin et al. |
| 5,438,460 A | 8/1995 | Coker et al. |
| 5,448,424 A | 9/1995 | Hirano et al. |
| 5,528,607 A | 6/1996 | Weng et al. |
| 5,570,379 A | 10/1996 | Sasaki et al. |
| 5,579,324 A | 11/1996 | Buhrgard |
| 5,629,983 A | 5/1997 | Fujimoto |
| 5,696,639 A | 12/1997 | Spurbeck et al. ............. 360/51 |
| 5,712,863 A | 1/1998 | Gray |
| 5,737,142 A * | 4/1998 | Zook ........................... 360/49 |
| 5,815,514 A | 9/1998 | Gray |
| 5,852,529 A * | 12/1998 | Ko et al. ...................... 360/40 |
| 5,889,796 A * | 3/1999 | Whaley ....................... 714/769 |
| 5,937,020 A * | 8/1999 | Hase et al. ................. 375/376 |
| 6,028,727 A * | 2/2000 | Vishakhadatta et al. ...... 360/51 |
| 6,046,691 A * | 4/2000 | Aziz et al. ..................... 341/58 |
| 6,111,712 A * | 8/2000 | Vishakhadatta et al. ...... 360/51 |

\* cited by examiner

MAGNETIC TAPE DRIVE APPARATUS INCLUDING A VARIABLE RATE ENCODER

BACKGROUND OF THE INVENTION

The present invention relates to the storage of digital data on magnetic media. More specifically, the invention relates to the use of a partial response, maximum likelihood (PRML) recording channel in a tape drive.

Partial response signaling has been used extensively in digital data communication systems. Its potential applicability to digital magnetic recording was noted in 1970 in an article by Kubayshi entitled Application of Partial-Response Channel Coding to Magnetic Recording Systems, IBM Journal of Research and Development, January 1971, pp. 64–74. Although partial response signaling was soon applied experimentally in the recording channels of hard disk drives (see, for example, Price et al., An Experimental, Multilevel, High Density Disk Recording System IEEE Transactions on Magnetics, Vol. 14, No. 5, September 1978), commercial applications in this area have only recently been developed. Disk based PRML systems are described, for example, in U.S. Pat. No. 5,422,760 to Abbott et al., and U.S. Pat. No. 5,430,768 to Minuhin et al. The disclosures of the two above described articles and two above described patents are hereby incorporated by reference in their entirety.

In a partial response, maximum likelihood recording channel, the data is encoded onto the media at a rate which produces a high degree of intersymbol interference. This intersymbol interference, which would prevent accurate decoding in a peak detection system, is interpreted with a low bit error rate by a bit decoder which decodes the bit stream in the context of the previously interpreted bits. As is demonstrated by the literature and current interest in partial response signaling in magnetic recording, this method of data recording produces substantially improved channel utilization, although at the expense of a more complicated detection and decoding circuit.

It is well known that Class IV (PR4) partial response signaling is well suited to magnetic recording. Certain magnetic tape systems are especially suited to the use of the Extended Class IV (EPR4) system, characterized by the polynomial $1+D-D^2-D^3$, wherein "D" denotes the one bit delay operator. During the read operation, the analog read voltage is sampled by an analog to digital converter which is synchronized in phase and frequency with the incoming bit stream. With EPR4 signaling, discrimination of the digitized read voltage results in a five level output stream (often denoted as +2, +1, 0, −1, −2) which is decoded by the maximum likelihood decoder into a serial output of recorded bits.

Although the spectral response of some head/tape interfaces are suited to EPR4 signaling, there are additional problems when using maximum likelihood decoders with tape media that are not present in disk drives. The most significant of these is the high degree of instantaneous speed variation (ISV) of the tape. In disk based systems, the speed of the media under the read head is far more stable than it is with tape. Tape stretching and slippage in a tape drive recording apparatus cause the detected bit rate to vary substantially.

High levels of ISV pose problems because in both peak detection systems and partial response systems a phase-locked-loop must substantially synchronize the sampling by the analog to digital converter to the incoming bit stream. In a peak detection system, phase errors are computed by monitoring the slope of the read signal at the sampling time. The phase and frequency of ADC sampling is corrected if sampling is offset from the transition induced peaks where the read waveform has a zero slope. In partial response systems, phase errors are calculated by comparing sampled read signal amplitudes with the amplitudes expected at that sample time for the given decoded bit stream. In both cases, the calculated phase error is typically converted into an analog voltage or current signal with a digital to analog converter. This analog phase error signal is input to a current or voltage controlled oscillator which in turn controls the sample times of the analog to digital converter which is monitoring the read signal.

To accurately decode an analog read signal produced by a read head in a magnetic data storage device, therefore, the read signal should include phase information which is easily detectable by the phase locked loop to produce feedback which ensures accurate tracking. Furthermore, the phase information contained in the read signal should be quickly converted into a timing correction to minimize the lag between timing error detection and timing error correction.

The first concern, ensuring adequate phase content in the analog read signal, may be addressed by coding the data stream such that long strings of 1s, 0s, or other patterns producing a low read signal amplitude in the data sequence are prevented. Due to high levels of ISV, tape drive recording channels have typically been implemented using relatively inefficient block codes. This has limited the data density of magnetic tape systems considerably.

The second concern, reducing the delay between timing error detection and correction, has also remained insufficiently addressed. When partial response signaling is used, the problem is especially acute because the timing window in which the analog to digital sampling must occur for reliable decoding is much narrower than with peak detect systems. High levels of ISV therefore pose greater problems with partial response channels than with peak detecting channels, and this factor has limited the application of partial response coding to digital tape storage. Although the phase-locked-loop will resynchronize the analog to digital sampling to the incoming bit phase and frequency in response to variations in tape speed, the loop filtering, digital to analog conversion, and oscillator control typically introduce a rather lengthy delay before timing is completely restored.

SUMMARY OF THE INVENTION

The present invention is directed to digital gain and timing control in a magnetic recording system. The invention is particularly applicable to magnetic recording systems in which media speed variations are relatively large, such as in magnetic tape systems. A completely digital timing control circuit reduces delays and other problems associated with timing control that includes analog feedback circuitry.

In one embodiment, the invention includes a tape drive for storing data on magnetic tape comprising write electronics including a variable rate encoder, wherein the variable rate encoder is configured to insert bits into a received data stream at a rate which depends on the content of the data stream. The tape drive may also comprise a write head for writing the data stream including the inserted bits to linear tracks on a magnetic tape as well as read electronics for reading the data stream from the magnetic tape. The read electronics may comprise a digital timing feedback loop for maintaining phase lock with the data stream. In some embodiments, the variable rate encoder satisfies a (0,k) run length limited code constraint.

A further aspect of the present invention includes sampling an analog read signal at a frequency higher than the bit rate of the data bits being read. Accordingly, the invention also comprises a partial response, maximum likelihood recording channel comprising read electronics and an analog, to digital converter for periodically sampling an analog read waveform, wherein the frequency of sampling is substantially constant, and is predetermined to be greater than the bit rate of the received encoded serial bit stream. In such a system, timing control may be accomplished without a voltage or current controlled oscillator.

Methods of maintaining phase lock in partial response read channels are also provided. In one embodiment, such a method comprises computing a read signal amplitude error in a partial response bit decoder; digitally filtering the amplitude error to define a timing error metric, and modifying the computation of an interpolated read signal amplitude in response to the timing error metric.

DETAILED DESCRIPTION OF THE PREFERRED EMBODIMENT

A preferred embodiment of the present invention will now be described with reference to the accompanying Figures, wherein like numerals refer to like elements throughout.

Figure 1:
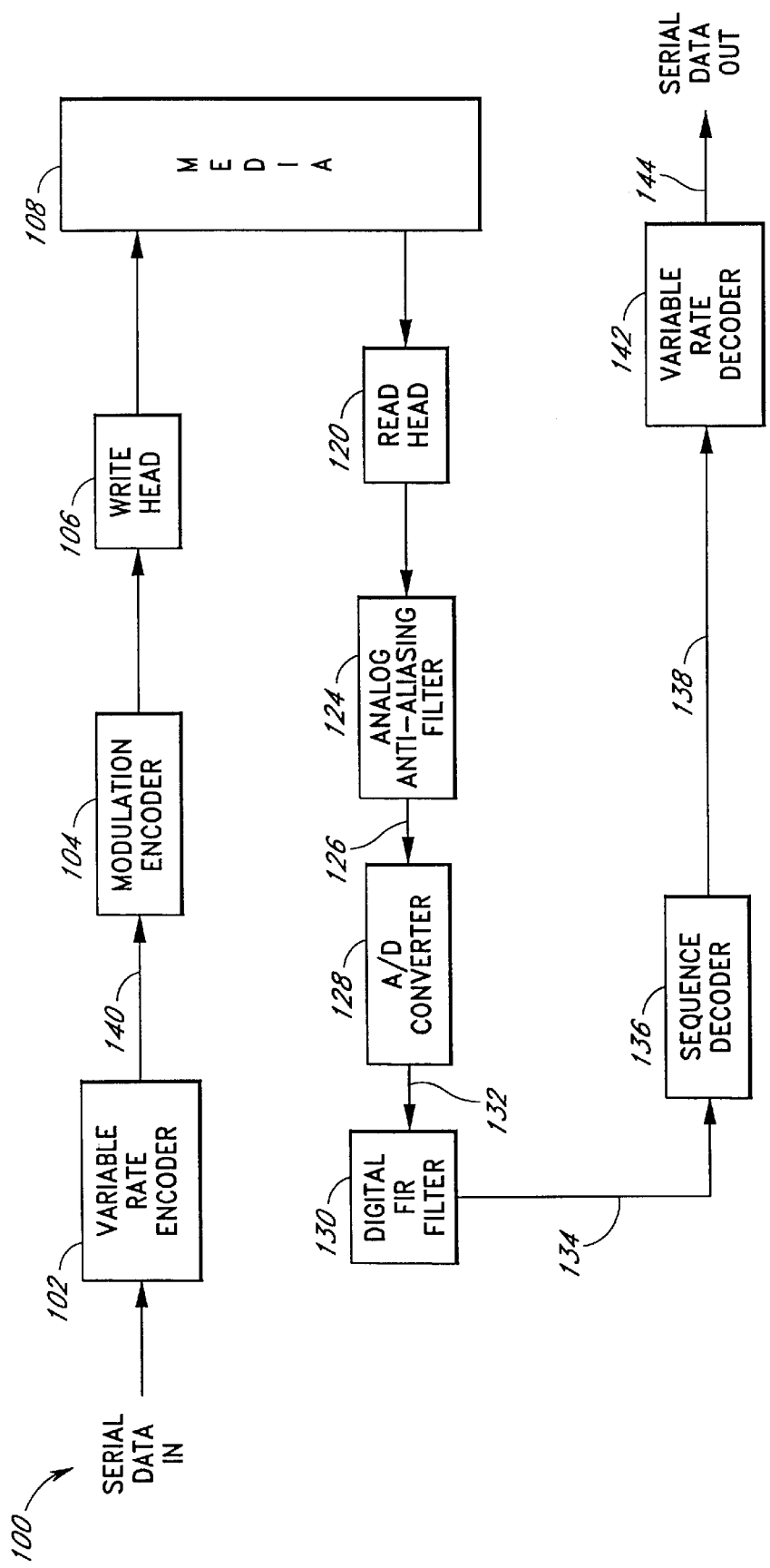
FIG. 1 is an overall system diagram that illustrates read and write channels associated with data storage on a data storage media.

FIG. 1 illustrates a block diagram of a data storage recording channel. The input to the recording channel is a serial stream of binary digits 100 representing data to be stored on a magnetic medium. The incoming bit stream 100 is formatted and encoded by a variable rate encoder 102. As will be described in detail below, the encoding at block 102 includes variable rate run-length limited encoding to help ensure, among other things, adequate phase and amplitude content in the read signal produced by the recorded bit stream when the data is subsequently retrieved from the data storage media. Run length limited codes may be characterized in part by a code constraint (n,k), where n denotes the minimum distance between 1s, and k denotes the maximum number of consecutive zeros. Run length limited codes having a low value for n are therefore more efficient. As will be described below, the encoding technique performed by the variable rate encoder 102 may advantageously comprise a (0,k) code which provides for high data density, while maintaining adequate phase and amplitude content in the recorded bit stream.

Following formatting and encoding at block 102, the encoded bit stream is then translated into a modulated write current by a modulation encoder 104 which drives an inductive write head 106 in close proximity to a magnetic media 108. In one embodiment, the recording channel is used in a linear track tape format, although aspects of the invention have advantageous application to other tape formats as well as to various magnetic disk environments. Various forms of modulation coding are known in the art and may be used, such as the NRZ-M modulation format (write current reversal at every "1" in the bit stream).

During read out of the data stored on the media 108, a read head 120, which may be inductive, magnetoresistive, or any other field sensing transducer, produces a read voltage or current output which varies as the head passes over magnetic transitions previously laid on the media 108 by the write head 106. The signal from the read head 120 then is passed to the input of an analog low pass anti-aliasing filter 124. The analog filter 124 outputs a filtered analog read signal at node 126. A flash analog to digital converter 128 periodically samples the analog read signal present at node 126, and a FIR filter 130 receives the digitized amplitude values at node 132, and digitally filters the sampled values according to a desired spectral shape.

The output of the filter 130 provides the input at node 134 to a sequence decoder 136, which translates the sequence of filtered digital samples present at node 134 into a decoded serial bit stream which is output at node 138. The data stream at node 138 is then fed to a variable rate decoder 142 which among other things detects and removes added bits which were inserted by the variable rate encoder 102 during the write process, thereby reproducing the original data stream 100 at output node 144.

Of course, the serial data stream output at node 144 is ideally identical to the serial data input stream 100 input to the system during the write process, but timing and gain errors, noise, signal dropouts, and other error sources invariably introduce a certain bit error rate in the output at node 144. These errors may be correctable by the error correction encoding scheme used, but reductions in the raw number of errors present at node 144 are desirable. In accordance with the invention, timing and gain errors are reduced in an efficient low overhead manner by coding the data sequence in a manner which helps ensure that the read signal contains sufficient amplitude and phase content. It is one aspect of the invention that the variable rate encoder 102 inserts bits into the incoming data stream 100 to help ensure that the samples at node 132 which are being filtered and interpreted can be appropriately amplified and can be obtained at sampling times which are in a proper phase relationship with the transitions on the media 18 being detected.

In the specific embodiment described below with reference to FIGS. 8–11, the variable rate encoder 102 inserts bits which produce a recorded bit stream having characteristics which are advantageous for interpretation by an Extended Class IV partial response (EPR4) read channel. In the case of EPR4 partial response signaling the filter 130 may comprise a digital bandpass filter with a peak near ¼ the nominal bit rate of the data stream being read off of the magnetic media 108, and the sequence decoder 136 may comprise a Viterbi partial response, maximum likelihood decoder. It will be appreciated, however, that the principles of the present invention may be applied to produce data write formats adapted for other read channel designs.

Figure 2:
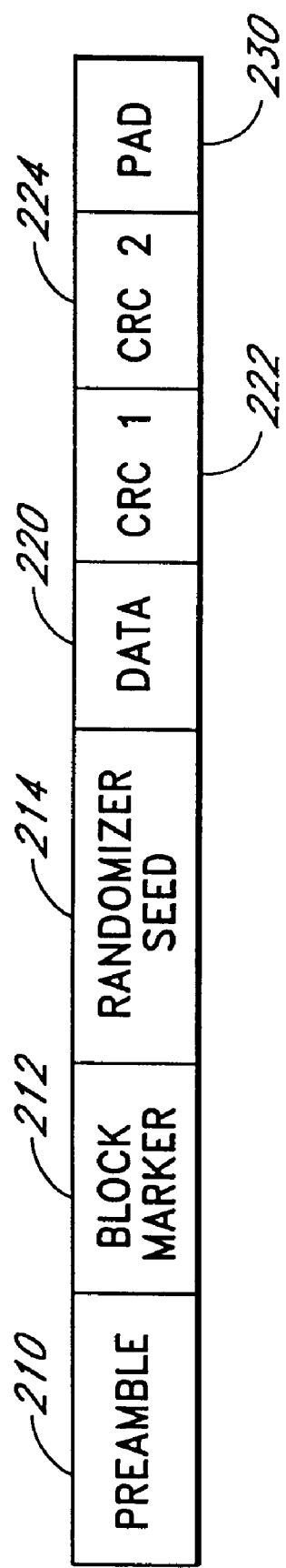
FIG. 2 schematically illustrates the format of a data block in one preferred embodiment of the invention.

FIG. 2 schematically illustrates a format of a data block assembled by the variable rate encoder 102 for storage to the media 108 in one embodiment of the invention. The overall block format is application specific and may vary widely. As shown in FIG. 2, each data block includes a preamble segment 210, a block marker 212, a randomizer seed or code 214, a data portion 220, a cyclical redundancy check (CRC) portion 222 and 224, and a pad 230. The preamble 210 typically comprises a four-byte segment which is used to identify the beginning of a new data block. The preamble bit sequence is selected to produce a read head response during the subsequent read process that is easy for the read channel to acquire phase lock with in preparation for decoding the data that follows. In one embodiment described in additional detail below, the preamble comprises four sequential copies of the byte 00110011. This preamble sequence is designed to produce a large read channel response in an Extended Class IV (EPR4) partial response read channel. The block marker 212 marks the transition out of the preamble segment, and may comprise the two bits 11.

Following the block marker 212, a randomizer seed 214 used to randomize the data 220 portion of the block is present. The randomizer seed may advantageously comprise a three byte (24 bit) sequence which is non-deterministically selected for each data field. During the write process the randomizer seed portion 414 of the block may remain un-randomized, or it may be randomized using a fixed seed which is not stored on the media. To reduce the likelihood of read errors when reading the seed portion 214 of the data block, the seed 214 may be further encoded using the variable rate encoding scheme set forth herein. This embodiment is used as an example in the discussion associated with FIGS. 8–11 below. Alternatively, it may be advantageous to use a higher overhead encoding scheme for the seed field 214 than the data field 220. For example, the randomizer seed field 214 could be encoded using a fixed 4/5 or 8/9 code. This is less efficient than the variable rate insertion code used on the data 220 and CRC portions 222, 224 of the block, but it provides a better assurance of readability in the absence of randomization. As another alternative, the variable rate bit insertion can be performed on the seed field 214, but with different bit insertion thresholds for null sequence length, phase content, and amplitude variations than are utilized when writing the data field 220 to better ensure adequate read characteristics for the randomizer seed.

The data field 220 contains data for storage on the media 108 which will be randomized using the randomizing polynomial and randomizer code and also variable rate encoded with appropriate bit insertions as is described below with reference to FIGS. 8–11. This data field 220 may vary in length. In one specific embodiment, the length of the data field 220 is selectable from zero to 16,383 bytes in length. As the data field 220 will also include bits inserted during the variable rate encoding process, the total length of the data field 220 will vary depending on the content of the data to be stored.

The CRC segment 222, 224 advantageously comprises a six byte field calculated from the randomizer seed 214 and data 220 fields prior to randomization. The CRC fields 222, 224 may also be error encoded with the variable rate bit insertion methods described below. Thus, the CRC fields 422, 424 may total more than 48 bits in length.

As shown in FIG. 2, in one advantageous embodiment, the CRC segment is broken into two independent CRC fields, a 17 bit CRC field 222, and a 31 bit CRC field 224. The polynomial used to calculate the 17 bit CRC field may be:

$$g(x)=x^{17}+x^{15}+x^{14}+x^{13}+x^{11}+x^9+x^6+x^5+x^4+x^3+1$$

The polynomial used to calculate the 31 bit CRC field may be:

$$g(x)=x^{31}+x^{27}+x^{23}+x^{19}+x^{15}+x^{11}+x^{10}+x^9+x^7+x^6+x^5+x^3+x^2+x+1$$

With two independent CRC fields 222, 224, most errors will be flagged by the 17 bit CRC check in time for the system to complete a signal reacquisition prior to beginning a read of the data in the next block. Error detection with a single 48 bit CRC field requires a longer time period, and the system will typically be processing the next block of data before the error condition is flagged. Signal reacquisition to help prevent further read errors of subsequent data blocks therefore takes place over the next block, and at least two blocks must typically be discarded to recover from a CRC error originating in one block.

The pad field 230 comprises a one, two or three bit field which has the length required to make the randomizer seed, data, CRC fields, and pad together comprise a modulo-4 bit count. In advantageous embodiments utilizing an EPR4 read channel as described above, one, two and three bit pads comprise 1, 11, and 011 respectively. In multi-channel systems, the pad 230 for a block being processed in one channel may be further extended with copies of the word 0011 until one or more other channels complete the writing of the pad field and the blocks are synchronized across the separate channels. Following the pad 230, the preamble sequence for the next block is begun. Like the preamble 210 and block marker 212 sequences, the pad 230 is advantageously not randomized or variable rate encoded.

Figure 3:
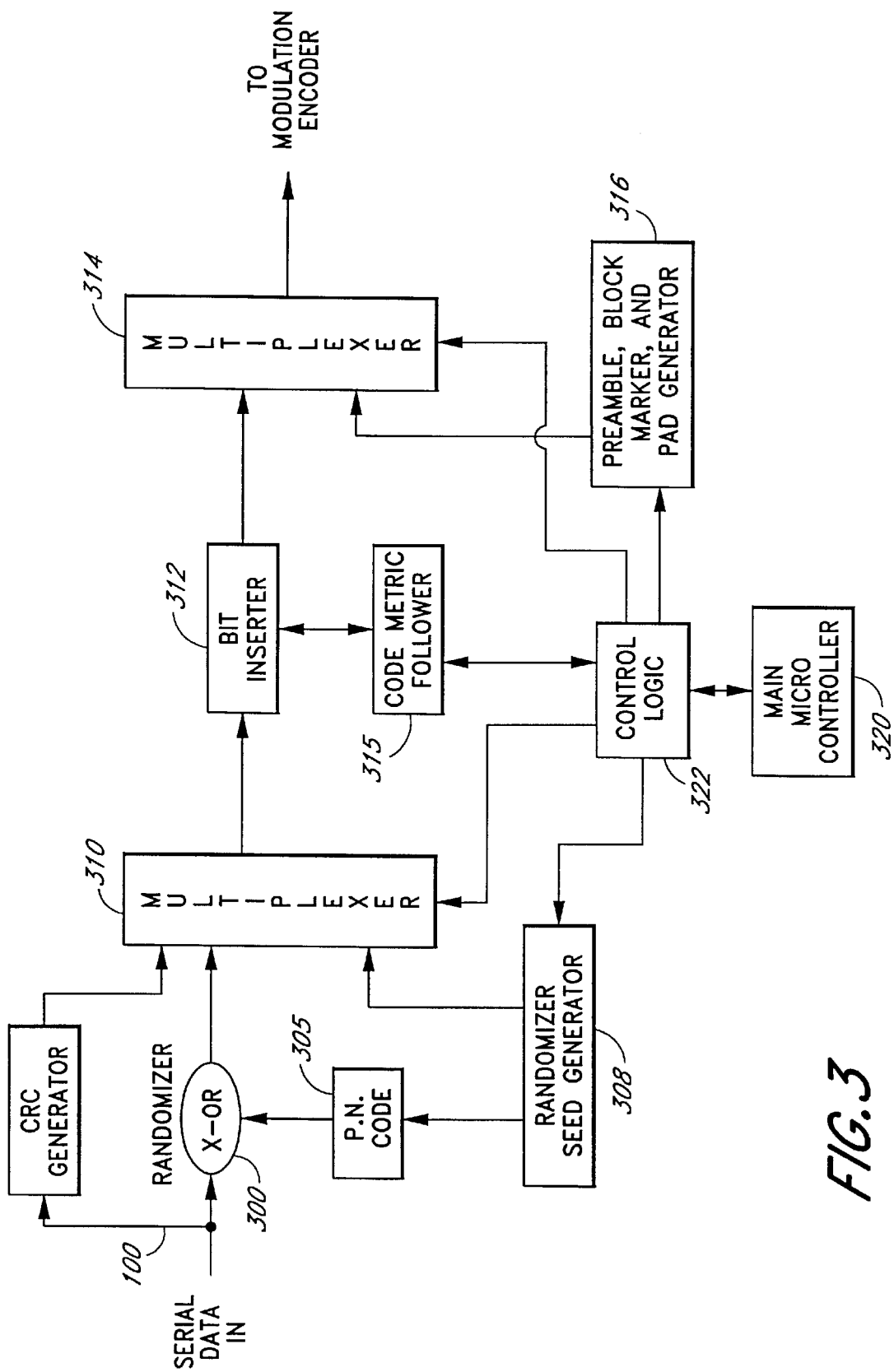
FIG. 3 is a simplified block diagram that illustrates the main functional elements of the variable rate encoder of FIG. 1.

FIG. 3 is a schematic block diagram that illustrates the main functional elements of the variable rate encoder 102 of FIG. 1. As mentioned above, the variable rate encoder shown in FIG. 3 may advantageously be provided in a disk or tape drive. As shown in FIG. 3, a data pattern input 100 enters a randomizer 300. In one preferred embodiment, the randomizer 300 comprises an exclusive OR gate, which receives the input data pattern on a first input and receives a pseudo-random noise code via a second input from a pseudo-noise code generator 305. As will be described in greater detail below, the pseudo-noise code generator 305 comprises a shift register and adder configuration, which is defined by a randomizer polynomial. Of course, it will be appreciated that the randomization of data using a linear feedback shift register (LFSR) is well understood and conventional. In one embodiment, the polynomial defining the randomizer configuration is:

$$g(x)=x^{24}+x^{21}+x^{19}+x^{18}+x^{17}+x^{16}+x^{15}+x^{14}+x^{13}+x^{10}+x^{9}+x^{5}+x^{4}+x+1$$

The pseudo-random sequence generated by the LFSR and output to the exclusive OR gate 300 is determined by both the randomizer polynomial set forth above which defines the tap positions and other aspects of the LFSR as well as by the initial state of the bits stored by the LFSR. These initial bits define a randomizer code, also referred to as a randomizer seed. By setting the initial values of the pseudo-noise code generator register (i.e., the randomizer code), the pseudo-noise sequence that is generated by the generator 305 can be reconfigured so that the pseudo-noise sequence can easily be changed on the fly (e.g., in between data blocks). Randomizer codes may be created using dedicated randomizer seed generator logic 308, or may be created using the microcontroller 320 typically provided as a part of the data storage device such as the tape or disk drive utilizing the recording channel herein described. Advantageous processes for generating and storing the randomizer codes are set forth in detail with reference to FIG. 5.

The output of the randomizer 300 feeds a multiplexer 310, which has as a second input an output from randomizer seed generation circuitry 308. The multiplexer also has a third input from CRC generation circuitry. The multiplexer 310 is controlled so as to help produce the block format described above with reference to FIG. 2.

The output of the multiplexer 310 feeds a bit inserter 312. The bit inserter 312 comprises a variable rate bit inserter which inserts bits into an input bit stream to increase the phase and amplitude content of the data stream to reduce the read channel error rate. This bit insertion is directed by a code metric follower 315 described in more detail in conjunction with FIGS. 7–11. The output of the bit inserter 312 is provided to a second multiplexer 314 having a second input from preamble, block marker, and pad generator circuitry 316. As with the first multiplexer 310, the second multiplexer also operates to help create the data block format illustrated in FIG. 2. The output of the second multiplexer 314 is routed to the modulation encoder 104 of FIG. 1.

In operation, the main microcontroller 320 provides a write initiation signal to encoder control logic 322. The control logic 322 instructs the preamble, block marker, and pad generator circuitry 316 to generate a preamble and block marker sequence, and this sequence is selected for output to the modulation encoder via the second multiplexer 314. Also, a randomizer seed is generated by the randomizer seed generator circuitry 308, and this randomizer seed is fed to the first multiplexer 310, and is selected for output to the bit inserter 312.

The multiplexer 310 output is monitored by the code metric follower 315, which determines whether or not the data stream meets metric criteria defined to minimize the likelihood of decoding error. When the code metric follower 315 determines that a bit is to be inserted within the data stream, the appropriate bit is inserted by the bit inserter 312. In the embodiment described in detail below with reference to FIGS. 7–11, the insertion comprises a single bit having a polarity which depends on a previously received bit in the data stream. Alternatively, a multiple bit word (i.e., having two, three, four or more bits) could be inserted as called for by the specific application. When the encoded randomizer seed is output from the bit inserter 312, the second multiplexer 314 is configured to pass the bit inserter output to the modulation encoder for writing to the media 108. Thus, the randomizer seed is variable rate encoded and written to the media immediately following the preamble and block marker.

Following randomizer seed routing through the multiplexer, the data to be stored 220 is forwarded to the randomizer 300 for randomization using the seed generated by the generator circuitry 308 and just stored to the media 108. The data is also routed to the CRC generator circuitry 309 so that the CRC fields 222, 224 can be computed. At this time, the multiplexer 310 is configured to pass the randomized data to the bit inserter 312 for variable rate encoding. The encoded data output from the bit inserter 312 to the second multiplexer 314 is then passed to the modulation encoder for writing to the media 108.

After the data field 220 is fed through the multiplexer 310, the multiplexer 310 is configured to pass the calculated CRC fields to the bit inserter 312, which are also variable rate encoded and passed through the second multiplexer 314 to the modulation encoder for writing to the media 108. Finally, the pad field 230 is generated based on the bit count of the whole block, and is routed from the preamble, block marker, and pad generator circuitry 316 through the multiplexer 314, and to the media 108. Thus, with the proper timing of the multiplexers 310, 314 and the other data transfer and encoding circuitry of FIG. 3, the block format of FIG. 2 is written to the media.

Figure 4:
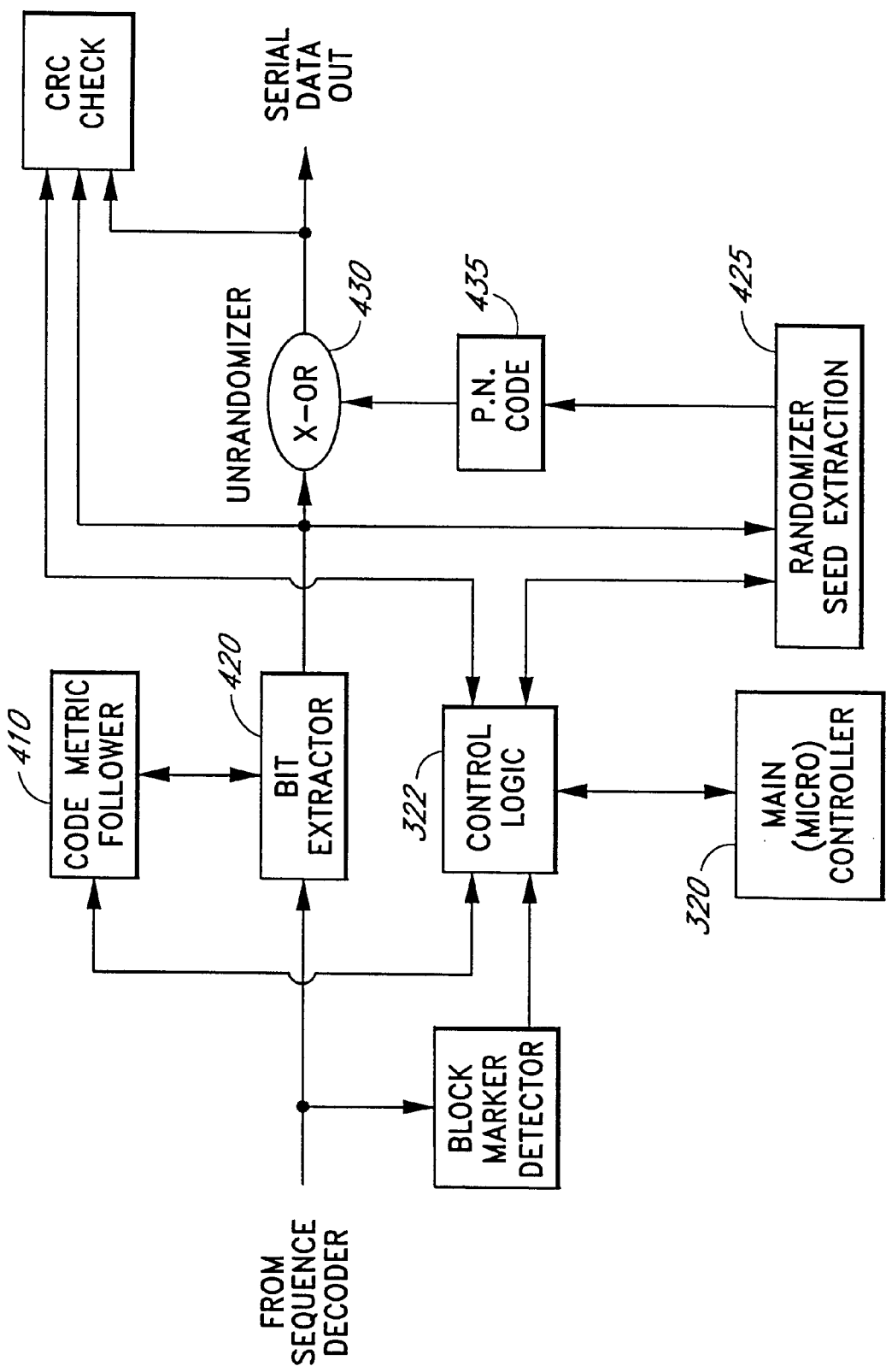
FIG. 4 is a simplified block diagram that illustrates the main functional elements of the variable rate decoder of FIG. 1.

FIG. 4 is a schematic block diagram which illustrates the main functional elements of the variable rate decoder 142 of FIG. 1. It will be appreciated that the basic function of the variable rate decoder 142 is to undo the bit insertions and randomization performed by the variable rate encoder 102 so as to reconstruct the original serial bit stream 100. Accordingly, the code metric follower 410 of FIG. 4 analyzes the incoming bits in substantially the same manner as the code metric follower 315 of FIG. 3. The code metric follower 410 monitors the data stream output by the sequence decoder 136 and generates command signals for a bit extractor 420. When the code metric follower 410 in the decoder detects a pattern that indicates that the next bit is a bit inserted by the variable rate encoder 102 during the write process, the bit extractor 420 removes the inserted data bit and at the same time verifies that the extracted bit is of the expected polarity. If the polarity is incorrect, an error status signal is generated to inform the microcontroller 320 via the control logic 322.

Prior to decoding the data field 220 of a formatted block, the preamble and block marker must be detected to determine the appropriate starting points for bit extraction and un-randomization. Accordingly, data from the sequence decoder is routed to both the bit inserter 420 and to preamble and block marker detection circuitry 402. When this detection circuitry detects the block marker following the preamble, the bit extractor 420 and code metric follower are initialized to their start states described with reference to FIGS. 8–11.

The first 24 bits output from the bit extractor 420 following the block marker will be the stored randomizer seed 214. These first 24 bits are detected and stored in randomizer extraction circuitry 425. The extracted randomizer seed 214 is forwarded to the pseudo-noise code generator 435 for unrandomization of the data field 220.

After the randomizer seed 214 is processed, the next field received from the sequence decoder is the data field 220. Following the extraction of inserted bits, the data is passed to the unrandomizer 430, where the data is exclusive ORed with the appropriate pseudo-noise sequence generated by the pseudo-noise sequence generator 435. The pseudo-noise sequence generator 435 is configured with the same polynomial set forth above with reference to the sequence generator 305 of FIG. 3, and is seeded with the 24 bit randomizer seed just extracted. Consequently, the same data pattern 100 which was initially written for storage to the media 108 is reproduced at the output of the unrandomizer 430. This original data sequence is also routed to CRC check circuitry 422.

After the data field 220 exits the bit extracter 420, the next output bit sequence is the 17 bit CRC value, followed by the 31 bit CRC value. As these sequences were not randomized initially, they are detected by the CRC check circuit 422 at the output of the bit extracter 420, prior to their entering the unrandomizer. The CRC check circuit then performs a 17 bit CRC check when the first CRC field is received, and a 31 bit CRC check when the 31 bit CRC is received. CRC errors are communicated to the microcontroller 320 via the control logic 322.

One aspect of the data coding technique set forth above is the randomization process. Data randomization is useful in these recording channels because data patterns that have an essentially random characteristic (i.e., data distribution) are statistically ideal for minimizing the number of data bits which must be inserted by the bit inserter 312 to break up bit patterns which increase the likelihood of a decoding error during readback of the data off of the medium 108.

In advantageous embodiments of the present invention, the randomizer code used to configure the pseudo-random sequence generator 305 is periodically changed in a non-deterministic manner. In these embodiments, the randomizer seed generator circuit 308 may be configured to comprise a randomizer code selector which non-deterministically selects randomizer codes for use by the pseudo-random code generator 305. Alternatively, the microcontroller 320 may be programmed for the non-deterministic selection of randomizer codes. Many techniques of non-deterministic number generation are known and would be suitable for use in the invention. Any procedure creating a complex, non-repetitive pattern for choosing consecutive codes can be used, as called for by the particular application. The non-deterministic character of the selection need only be sufficient to render the prediction of a sequence of randomizer codes impractical. It should also be noted that it is advantageous to be able to store data patterns which have been deliberately designed to anticipate changes in the randomizing sequence output by the pseudo-random code generator 305 (i.e., with the specific intent of producing a degenerate pattern). Thus, if a deterministic method of changing to new randomizer codes is used, it is still possible that such data streams will require an unacceptable number of bit insertions. Because the code bit sequence is not predictable with non-deterministic randomizer code selection, data streams which are intentionally encoded to frustrate data storage may still be randomized in such a way so as to reduce the average number of bit insertions per block to a tolerable level.

Several different implementations of data randomization are possible. In one advantageous embodiment shown in FIGS. 2–4, the randomizer code is non-deterministically changed for each data block written to the media, and the randomizer code used to randomize a given data block is stored in association with the data block so that it can be retrieved to de-randomize the data block when the data is later retrieved. When the randomizer code is changed with each data block, the coding efficiency remains high because only a statistically insignificant number of data blocks will contain a degenerate data pattern which requires a large number of bit insertions. Thus, the use of a plurality of non-deterministically variable randomizer codes will result in a bit insertion frequency which is within the allowable limits for storage on a magnetic medium. In one advantageous embodiment, each of the possible different randomizer codes ($2^n-1$ possibilities for an n-bit code) results in an orthogonal pseudo-noise sequence to that which was used on the last block of data. The reconfiguration to an orthogonal code ensures that the next block of data will not have a high correlation with the new pseudo-noise code. This is because orthogonal codes have an essentially zero correlation with one another so that, assuming that consecutive blocks of data have essentially the same bit pattern characteristic, when a bit pattern has a high correlation with a given pseudo-noise code, the same pattern will have a low correlation with a pseudo-noise code orthogonal to the original pseudo-noise code. Thus, by changing the randomizer code for the next block of data so that the new pseudo-noise code is orthogonal to the last pseudo-noise code, the number of insertions for the data bit stream can always be reduced beneath the threshold required for storage onto the media. In the randomization and bit insertion embodiments described herein, the average insertion rate may be maintained at under 1% regardless of data pattern.

Figure 5:
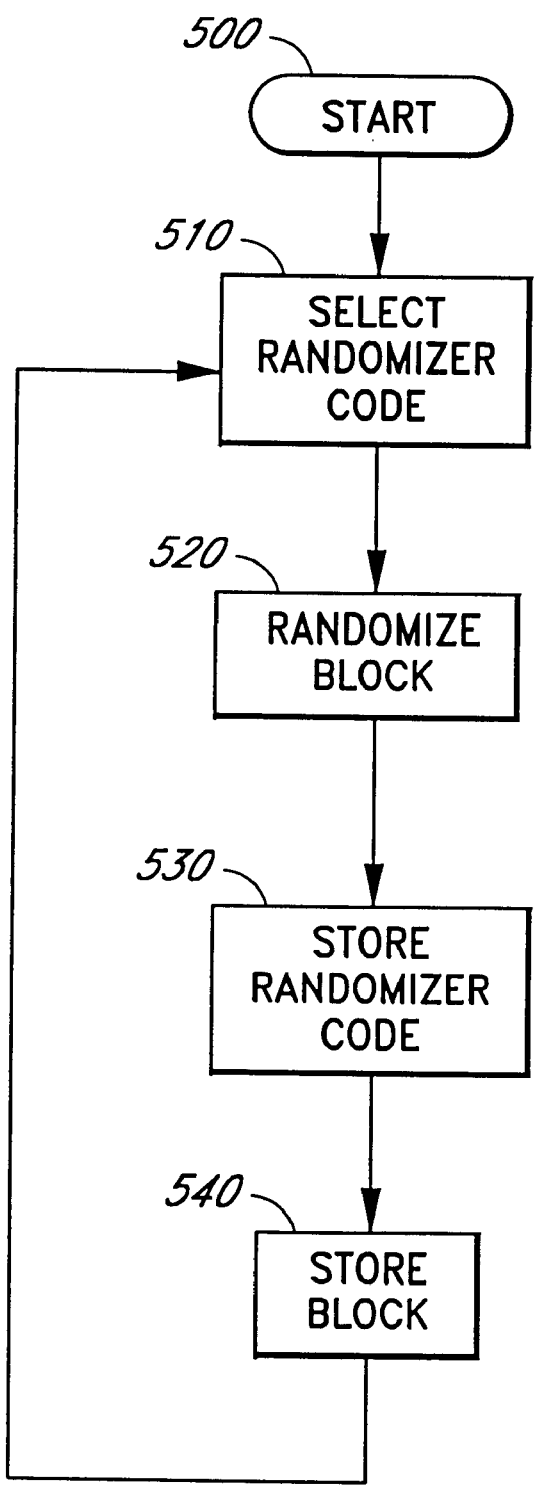
FIG. 5 is a flow chart illustrating the generation and storage of randomizer codes in one embodiment of the invention.

A general method for the generation and storage of randomizer codes according to one embodiment of the invention is illustrated in FIG. 5. The method initiates as represented within a start block 500. At step 510, when data is to be written to a magnetic media such as a disk or tape, a randomizer code is selected with which to randomize the block to be written. As mentioned above, this selection is preferably performed in a non-deterministic manner. As represented by block 520, the block is randomized with this randomizer code. When writing the data block to the media, at block 530 the randomizer code is stored, typically in a header portion of the data block. Also, at step 540, the data itself is stored on the media. After this data block is written, the system loops back to step 510, and selects a new randomizer code for use with the next data block. Once again, the selection is preferably performed in a non-deterministic manner, and the respective randomizer codes are stored on the media with the data itself. Non-deterministic selection of the randomizer code for each data block ensures that only an insignificant number of data blocks will require excessive bit insertions during a variable rate encoding process. It may also be noted that in this embodiment, it is not necessary to ensure that the randomizer code used for one particular block be different from the code used to randomize the prior block. With non-deterministic selection of a 24 bit randomizer code, identical randomizers for adjacent blocks will only occur about once every 16 million blocks.

It will also be appreciated by those of ordinary skill in the art that the steps of randomizing the block 520, storing the randomizer code 530, and storing the block 540 may be performed in any order. In many embodiments, data block randomization and storage are performed concurrently, as the data is stored as the randomized bits of the block are serially output from the randomizer.

Another alternative is available for preventing the storage of data with excessive insertions. The data pattern can be simultaneously fed to several encoder circuits, each using a different randomizer code. The output of the encoders is be routed to a buffer memory, where the randomized and encoded data block requiring the fewest insertions is selected for writing to the media, while the rest of the data blocks are discarded. It will be appreciated that when several randomized and encoded data sets are created, many alternative methods of selecting between them may be used. One alternative mentioned above is the selection of the data block incorporating the fewest insertions. Alternatively, one encoder may be a "primary" source of randomized and encoded data, unless the number of insertions exceeds a particular threshold, in which case a secondary encoder output is selected for writing to the media. If this secondary encoder output also includes excessive insertions, a third encoder output can be selected, and so on, until a data block of suitable length is found. The circuitry required to implement this scheme for, for example, four independent, alternative encoders is quite inexpensive. In this embodiment, non-deterministic selection of the plurality of randomizer codes is unnecessary. Rather, a plurality of fixed randomizer codes may be used. Data patterns which require an unacceptably high insertion rate for all randomizer codes used occur with a negligible frequency. It will be appreciated that periodic non-deterministic selection of new randomizer codes may also be performed with the multiple encoder embodiment. In this case, of course, the same microcontroller may be utilized to periodically generate all of the alternative randomizer codes.

Figure 6:
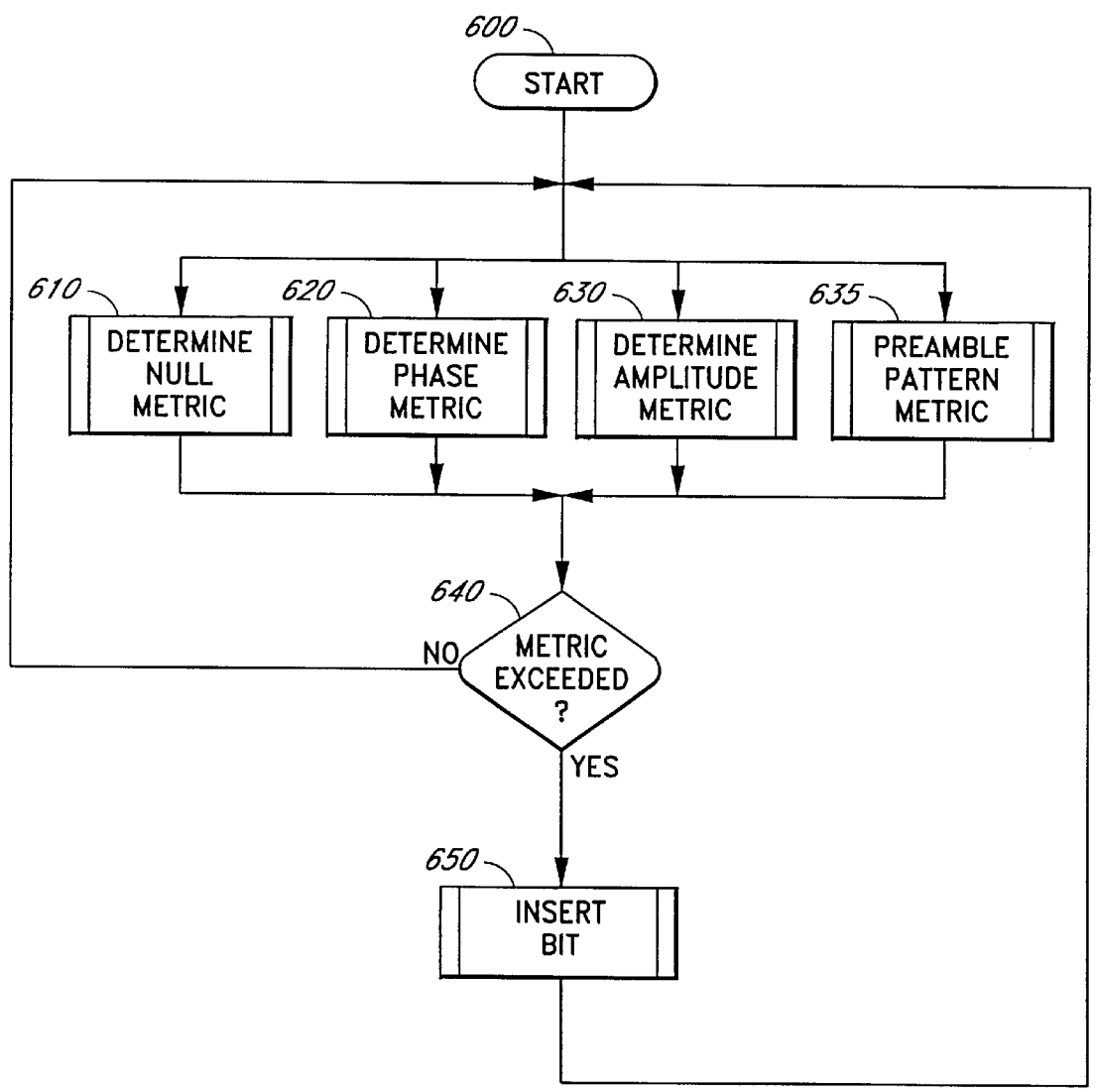
FIG. 6 is a flowchart that illustrates a general method used to insert a data bit in accordance with the variable-rate encoding method of the present invention.

Following data randomization as described above, bit insertion is performed by the bit inserter 312. FIG. 6 is a flowchart that illustrates the general method used in accordance with an embodiment of the present invention to insert data bits into the data field 220, CRC fields 222, 224, and the randomizer seed field 214 in accordance with an embodiment of the invention. As depicted in FIG. 6, the method initiates, as represented by a start block 600, and enters four metric subroutine blocks 610, 620, 630, 635 for parallel processing to determine a null metric, a phase metric, an amplitude metric, and a preamble pattern metric, respectively.

The null metric determined within the subroutine block 610, is used to detect data patterns such as strings of consecutive zeros, strings of consecutive ones, and other patterns which will produce a low read head response in the read channel utilized to read data from the media 108. As discussed briefly above, when a null pattern persists within the data stream for an extended period, the effects can be deleterious on the decoding so that errors are more likely to occur. Thus, the subroutine block 610 tabulates the length of a null pattern and outputs a flag or a metric value indicative of a null pattern. The method used within the subroutine block 610 to determine the null metric is described in greater detail below with reference to FIG. 9.

As represented within the subroutine block 620, the phase metric of the incoming data stream is determined. The phase metric is an indication of the phase content of the data stream. Phase content is high for bit sequences which produce rapid variations in read signal amplitude, and is low for bit sequences producing slowly varying read signals. As discussed briefly above, it is important for a data stream to contain adequate phase content since data decoding requires amplitude measurements of the analog read signal having an appropriate phase relationship with the magnetization transitions on the media 108. Thus, as a measure of the phase content of the incoming data stream, the subroutine block 620 outputs a phase metric value. The method employed within the subroutine block 620 is described in greater detail below with reference to FIG. 8.

As represented within the subroutine block 630, the amplitude metric is also determined. For accurate sequence decoding, read signal samples which are decoded by the sequence decoder 136 (FIG. 1) should be maintained within an expected amplitude range. An automatic gain control (AGC) circuit is therefore typically provided to amplify the signal from the read head to the appropriate level. However, because the overall read signal level will shift due to variations in read head tracking, media characteristics, etc., the gain must be adjusted to compensate for these variations. The AGC circuit may be provided in the analog signal or may be digital in nature and be part of the sequence decoder 136. Systems may include fixed and variable amplification circuits in more than one location in the read channel as well.

To accurately trim the gain applied to the signal, it is particularly advantageous if the read signal occasionally undergoes a maximum amplitude variation while reading the data pattern. Thus, if the determination is made within the subroutine block 630 that a bit pattern producing maximum amplitude variation has not occurred within a determined interval, then an amplitude flag, or a measurement value indicating how long it has been since a maximum amplitude variation, is output by the subroutine block 630. The method employed within the subroutine block 630 to determine the amplitude metric is described in greater detail below with reference to FIG. 10.

In one particularly advantageous embodiment of the invention, the code metric follower 315 is also configured to monitor the seed 214 and data 220 portions of the block in order to ensure that the preamble pattern is not reproduced outside of a preamble field. The monitoring for the preamble pattern is performed within the subroutine block 635. If it is determined that a portion of the preamble has been reproduced in the randomized data, then a flag is set which indicates the presence of the preamble portion in the data stream. The method employed within the subroutine block 635 to determine the preamble pattern metric is described in greater detail below with reference to FIG. 11.

The metrics determined within the subroutine blocks 610, 620, 630, 635 serve as inputs to a decision block 640 which determines if any one of the null, phase or amplitude metrics has been exceeded. In one advantageous embodiment, the subroutine blocks 610, 620, 630, 635 simply set flags to indicate that a metric threshold has been exceeded. If any one of the metrics has been exceeded, then a bit is inserted into the data stream to compensate, as represented within a subroutine block 650. However, if it is determined within the decision block 640 that the metric has not been exceeded, then the method returns to the inputs of the subroutine blocks 610, 620, 630, 635. The appropriate metric values are reset at the beginning of each new block of data.

Figure 7:
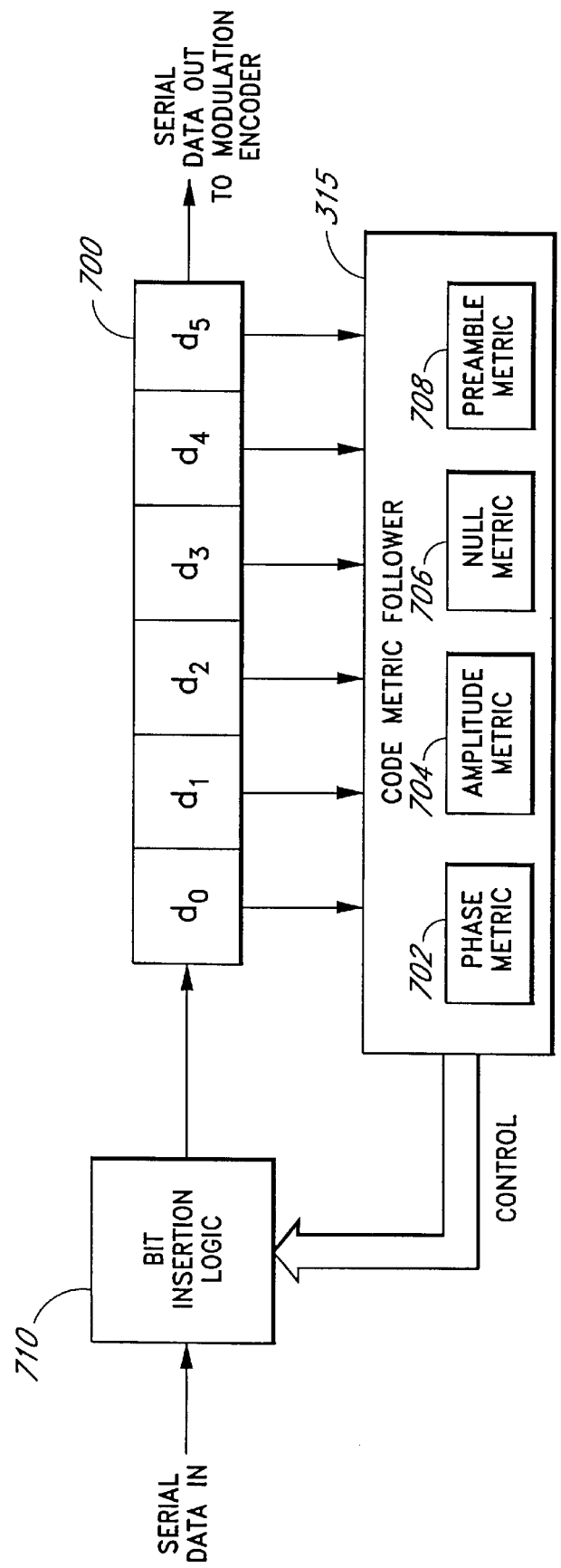
FIG. 7 is a simplified block diagram illustrating the functionality of one embodiment of the bit inserter and code metric follower of FIG. 2.

FIG. 7 is a more detailed view of the functionality of the bit inserter and code metric follower of FIG. 2 in one advantageous embodiment of the invention. As serial data flows through the bit inserter 312, the six most recent bits of the bit stream are analyzed by the code metric follower 315. These six most recent received bits are denoted $d_0$ through $d_5$, with $d_0$ being the most recently received bit, and with $d_5$ being the bit received six bits ago. As serial data is received by the bit inserter, the bits are shifted right in FIG. 7, from $d_0$ to $d_1$, $d_1$ to $d_2$, and so on, with $d_5$ being shifted out and routed to the modulation encoder 104.

With each new bit entering the six bit window 700 and with the associated right shift, the six bits in the window 700 are analyzed by the code metric follower 315, and the content of registers which store the phase metric 702, amplitude metric 704, null metric 706, and preamble metric 708 are updated depending on the polarities of the six bits present in the window 700. If an update to one or more of the metrics 702–708 results in a metric exceeding a predefined threshold, the code metric follower instructs bit insertion logic 710 to insert a bit into the data stream. In this event, the bit insertion logic 710 will shift a new bit into position $d_0$, rather than shifting the next bit of the data to be recorded into position $d^0$. In one advantageous embodiment, the polarity of the inserted bit is determined based on the polarity of the second to last shifted in bit, i.e. the polarity of bit $d_1$. In this embodiment, either a bit of identical polarity, or the inverse polarity of bit $d_1$ is shifted in by the bit insertion logic 710 depending on which of the metrics has exceeded its threshold.

With reference now to FIGS. 8–11, the bit analysis and metric updating procedures for one advantageous embodiment of the invention are described below. In this embodiment, metric updating procedures, comparison thresholds, and the polarity of the inserted bits are chosen to enhance the operation of an Extended Class IV partial response (EPR4) read channel. It will be appreciated, however, that the variable rate encoding principles described herein are applicable to other classes of partial response decoding, as well as to peak detecting read channels. In each case, the metric updating and inserted bits will be tailored to the characteristics of the read channel to be utilized during the subsequent data readback from the medium 108.

Class IV partial response signaling is known to be well suited to magnetic recording. Certain magnetic tape systems are especially suited to the use of the Extended Class IV (EPR4) system, characterized by the polynomial $1+D-D^2-D^3$, wherein "D" denotes the one bit delay operator. With EPR4 signaling, digitizing the analog read signal and discriminating appropriately timed signal amplitude measurements results in a five level output stream (often denoted as +2, +1, 0, −1, −2) which is decoded by the maximum likelihood sequence decoder into a serial output of recorded bits.

It is a characteristic of the EPR4 read channel that strings of consecutive 0s, strings of consecutive 1s, and strings of alternating 1s and 0s (i.e. the string . . . 10101010 . . . ) produce minimum read channel response. In these cases, the stream of filtered samples output from the FIR filter 130 of FIG. 1 remain near zero, and accurate sequence decoding is not possible. In contrast, strings of the four bit sequence "0011" produce a maximum read channel response, with the stream of filtered samples output from the FIR filter 130 defining an oscillating signal having a maximum peak to peak swing. Thus, for accurate sequence decoding in an EPR4 read channel, the data stream being read should include bit sequences such as "0011" which produce a large, easily decoded read channel response and should not include lengthy strings of bit sequences associated with small or slowly varying read channel responses. As will be appreciated with examination of FIGS. 8–11, the code follower 315 and the bit insertion performed under its control may be configured to help ensure a stored data sequence which produces an EPR4 read channel response that can be decoded with a low error rate.

Figure 8:
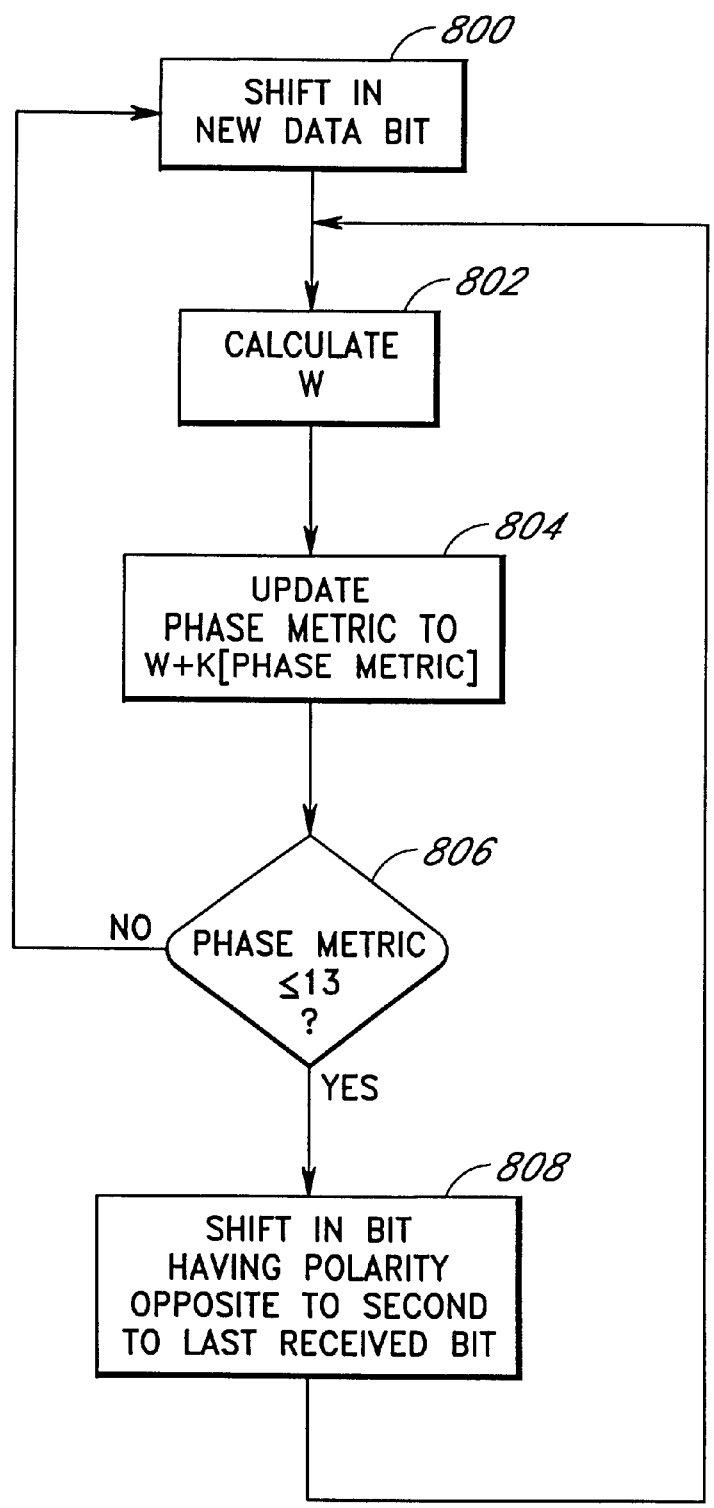
FIG. 8 is a flowchart that illustrates one embodiment of a process utilized to insert bits into data stream regions having low phase information content.

Referring now to FIG. 8, the process for updating the phase metric 702 and inserting a bit in response to this metric is described. The phase metric 702 is a value with a range of decimal 0 to 127. In one embodiment of the invention, the bit insertion function is initiated following the preamble 410 at the start of writing the appropriate randomizer seed 414 and data 420 portions of the block. At this time, the six bit window $d_0-d_5$ is initialized with the last four bits of the preamble sequence 410 and the two bit block marker 412 which together comprise the six bits 111100. The phase metric 602 is initialized at this point to a value of decimal 20. When window 700 analysis and metric updating begins at block 800 of FIG. 8, a new data bit is shifted in to position $d_0$. At block 802, an index "W" is calculated based on the six bit values in the window 700. This index is advantageously calculated with the following formula:

$$W=|4(d_2+d_3)-2(d_0+d_1+d_4+d_5)|$$

This index W will vary from 0 to a maximum of 8, with the maximum occurring when the polarities of the center bit pair $d_2$ and $d_3$ are the same, and are different from the polarities of all of the edge bit pairs $d_0$, $d_1$, and $d_4$, $d_5$. Thus, adjacent bit pairs of "00" and "11" in the data stream (which are associated with large and rapid swings in read signal amplitude in an EPR4 read channel and thus include a large amount of phase information) will tend to produce larger index values. In contrast, a high proportion of "0101" and other bit sequences associated with slowly varying read channel responses in an EPR4 read channel and consequent low phase content in this environment will tend to produce smaller index values.

Next, at block 804, the phase metric 802 is updated by multiplying the current phase metric value by a scaling factor K, which may advantageously comprise a constant 60/64, and then adding the index W calculated from the six bit window according to the above formula. It can be appreciated that if the index W is less than 60/64 of the current phase metric, the phase metric will be reduced by this calculation. If the index W is greater than 60/64 of the current phase metric, then the phase metric is increased by this calculation.

At decision block 806, the updated phase metric is compared to a threshold value, which may in this embodiment be advantageously selected to be decimal 13, although other values may also be suitable. If the updated phase metric is greater than 13, the system returns to block 800, and the next new data bit is shifted into position $d_0$. If the phase metric is less than or equal to 13, the system moves to block 808, and a bit which has polarity opposite to the second to last data bit received (i.e., the inverse of bit $d_1$) is shifted in instead of the next data bit. Whether the next bit shifted into position $d_0$ is the next bit of the data stream or is an inserted bit having polarity opposite to that of bit $d_1$, the system resumes with the calculation of the index W and the updating of the phase metric using the six bit window 700 as modified by the shifted in bit.

Figure 9:
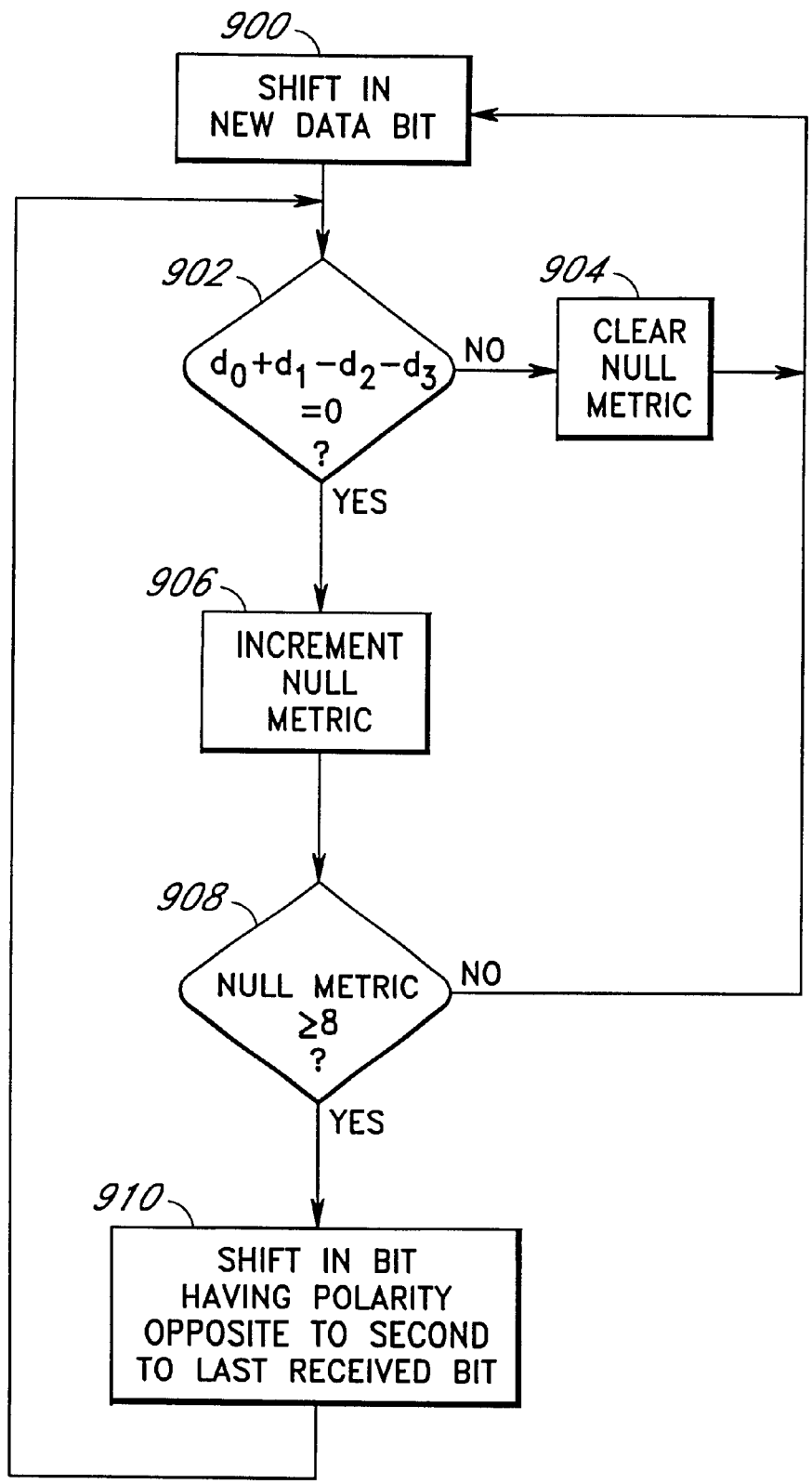
FIG. 9 is a flowchart that illustrates one embodiment of a process utilized to insert bits into data stream regions containing a null string.

FIG. 9 illustrates the process of updating the null metric 706 and inserting bits into the bit stream being recorded in response to the null metric 706 value. As described above, the initial state of the bit window 700 when beginning bit insertion is 111100, and at this point in block processing, the null metric is set to one. The null metric calculation begins at block 900, with the shifting in of the first bit of the data stream. The system then moves to decision block 902 where the first four bits of the six bit window are analyzed by the code metric follower 315 to determine if the bits $d_0$, $d_1$, $d_2$, and $d_3$ satisfy the relation:

$$d_0+d_1=d_2+d_3$$

If this relation is not satisfied (indicating that the four bits $d_0$ through $d_3$ do not comprise sequences 0000, 1111, 0101, or 1010), the system moves to block 904, and the null metric is cleared to zero. The system then loops back to block 900 and the next bit from the data stream is shifted into position $d_0$. If the relation is satisfied, indicating that the four bits $d_0$ through $d_3$ comprise 0000, 1111, 0101, or 1010, the system moves to block 906, and the null metric is incremented by one. Following the incrementing of the null metric at block 906, the system moves to a second decision state 908, where the null metric is compared to a threshold, which may advantageously be set to 8. If the null metric is less than eight, the system again loops back to block 900, and the next bit from the data stream is shifted in to position $d_0$. If, however, the null metric has been incremented to eight with the last bit, the system moves to block 910, and a bit which has polarity opposite to the second to last data bit received (i.e., the inverse of bit $d_1$) is shifted in instead of the next data bit. Whether the next bit shifted into position $d_0$ is the next bit of the data stream or is an inserted bit having polarity opposite to that of bit $d_1$, the system again evaluates the six bit window 700 as modified by the shifted in bit.

Figure 10:
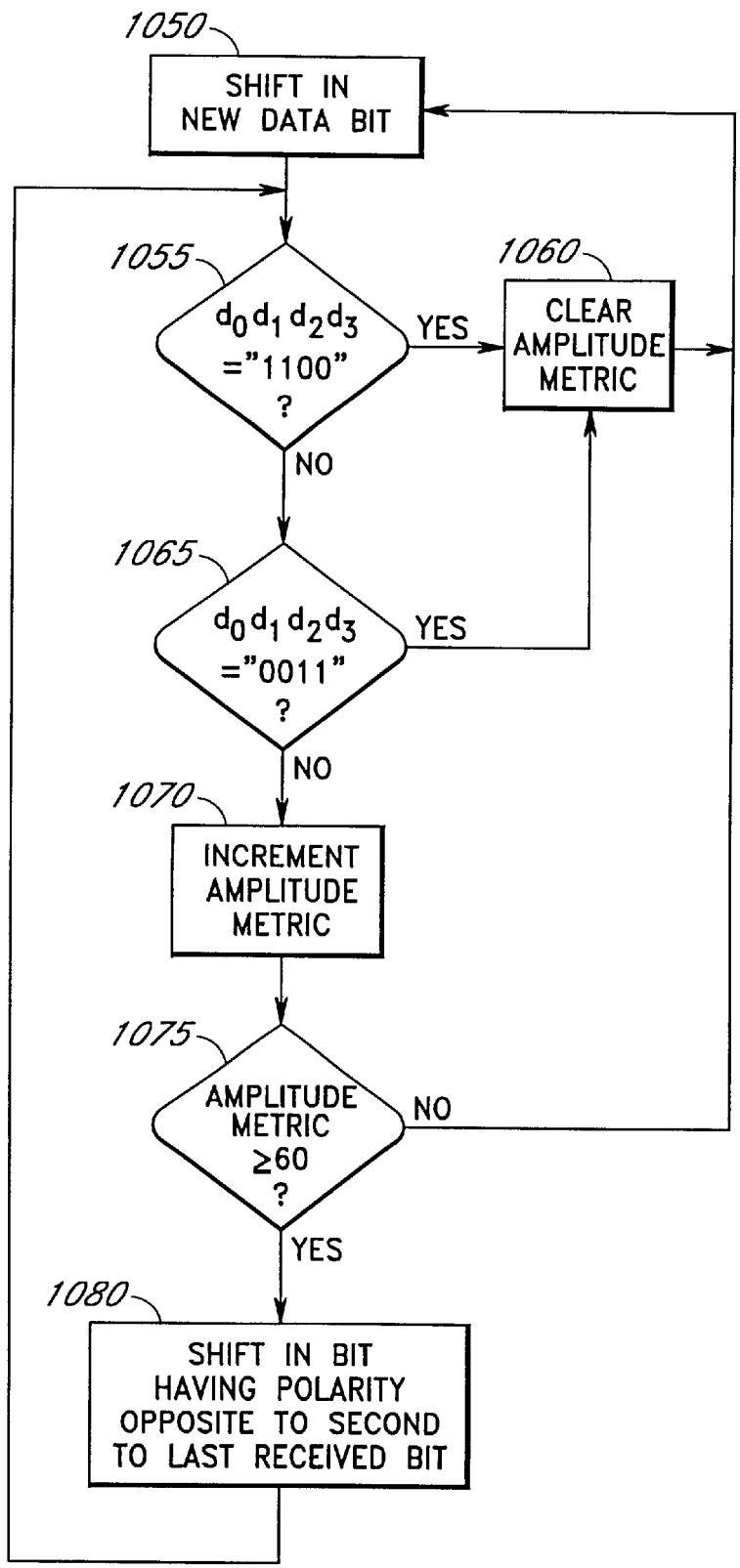
FIG. 10 is a flowchart that illustrates one embodiment of a process utilized to insert bits into data stream regions having low amplitude content.

Referring now to FIG. 10, the process of updating the amplitude metric and the insertion of bits into the data stream in response thereto is shown. As with FIGS. 8 and 9, the system begins at block 1050, where a bit of the data stream is shifted into position $d_0$. As before, if this is the first bit following the preamble 410 and the block marker 412, the six bit window 700 contains the string 111100, and the amplitude metric is initialized to decimal 2. As mentioned above, in an EPR4 read channel, the bit sequences 0011 and 1100 produce a positive or negative read signal swing of maximum amplitude. Accordingly, the code metric follower 315 may also advantageously be configured to test the data stream for these sequences.

This is shown in FIG. 10 at block 1055, where the code metric follower compares the four bits $d_0 d_1 d_2 d_3$ to the bit sequence 1100. If these four bits are equal to this bit sequence, the amplitude metric is cleared at block 1060, and the system loops back to block 1050 to shift in the next bit of the data stream. If the bits $d_0$ to $d_3$ are not 1100, the system moves to decision block 1065, where the same four bits are compared to the bit sequence 0011. If these four bits are equal to 0011, the amplitude metric is again cleared at block 1060, and the system loops back to block 1050 to shift in the next bit of the data stream.

If the bits $d_0$ through $d_3$ are neither 1100 nor 0011, the system continues to block 1070, and increments the amplitude metric by one. The system then enters the decision block 1075 and compares the amplitude metric to a threshold value which may be set to, for example, 60. If the amplitude metric is less than 60, the system again loops back up to block 1050 and shifts a new bit from the data stream into position do. If, however, the amplitude metric has been incremented to 60 with the last bit, the system moves to block 1080 and a bit which has polarity opposite to the second to last data bit received (i.e., the inverse of bit $d_1$) is shifted in instead of the, next data bit. As with the phase and null metric update processes described above, whether the next bit shifted into position $d_0$ is the next bit of the data stream or is an inserted bit having polarity opposite to that of bit $d_1$, the system resumes by again evaluating the content of the six bit window 700 as modified by the shifted in bit. It may be noted that regardless of the state of bits $d_0$ to $d_3$ when the amplitude metric reaches 60, sequential shifts into $d_0$ of the inverse bit $d_1$ will insert either a 0011 or a 1100 sequence into the data stream with the insertion of at most three bits.

Figure 11:
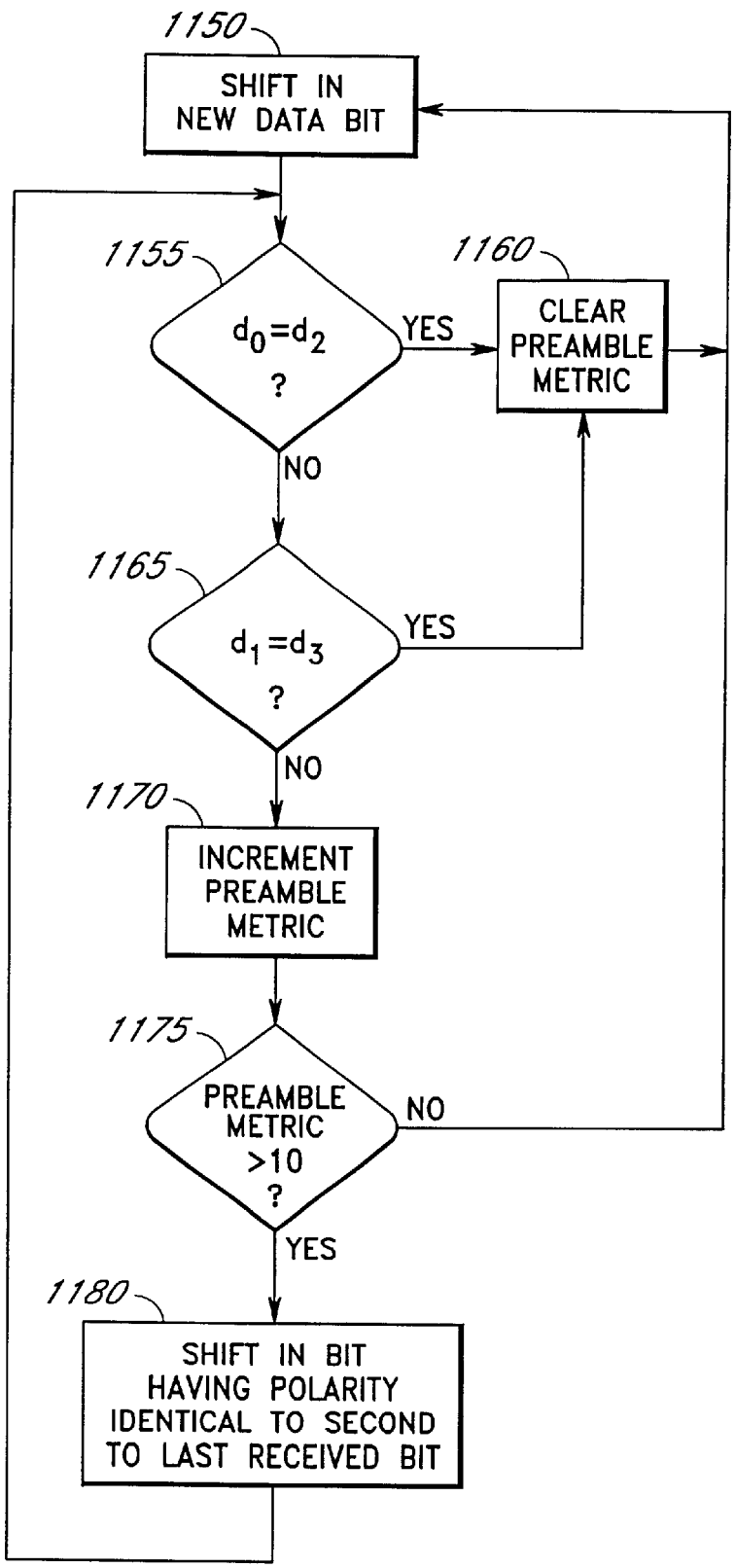
FIG. 11 is a flowchart that illustrates one embodiment of a process utilized to insert bits into data stream regions having a portion of a preamble sequence.

FIG. 11 illustrates the updating of the preamble metric 708 and the bit insertion performed in response thereto. The initial state at block 1150 of FIG. 11 is identical to that described above with reference to FIGS. 8–10. A bit of the data stream is shifted into position $d_0$, and if this is the first bit following the preamble 410 and the block marker 412, the six bit window 700 contains the string 111100 immediately prior to this shift of the first data bit. The preamble metric is cleared to zero at this point in block processing. At step 1155, the code metric follower 315 compares the bits $d_0$ and $d_2$. If these bits are equal, the three bits in positions $d_0$ through $d_2$ must be either 101, 010, 000, or 111, none of which are present in the preamble portion 410 of the data block described above. In this case, the system moves to step 1160, clears the preamble metric, and the next bit from the data stream is inserted as the system loops back to block 1150.

If bits $d_0$ and $d_2$ are not equal, at block 1165 the system compares bits $d_1$ and $d_3$. If these bits are equal, the system again moves to block 1160, clears the preamble metric, and loops back to block 1150 to shift in the next data bit. If, however, bits $d_1$ and $d_3$ are also not equal, the content of bits $d_0$ through $d_3$ must be a bit sequence which matches a portion of the preamble 410. In this case, the system advances to block 1170, and the preamble metric is incremented by one. Next, at block 1175, the preamble metric is compared to a threshold, which may be set to 10. If the preamble metric is equal to or less than 10, the system again loops back to block 1150, and the next new data bit is shifted in. If the preamble metric has been incremented to 11 with the last bit shifted in, the system moves to block 1180, and a bit having a polarity equal to he second to last shifted in bit (i.e., bit $d_1$) is shifted into position $d_0$. It will be appreciated that although inserting the inverse of bit $d_1$ (the insertion method used for the phase, null, and amplitude metrics) will tend to insert 1100 and 0011 sequences into the data stream, inserting a bit identical to bit $d_1$ will break any string of such sequences which produce a significant portion of a preamble pattern in the data field 420 of the block. Following bit insertion, the system continues by again evaluating $d_0$ and $d_2$ at block 1155 using the updated content of the six bit window 700.

Embodiments of the invention thus provide a highly efficient randomization and variable rate coding scheme for use with data storage on magnetic media. The invention is applicable to many types of media including magnetic disk and tape. The variable rate coding system described above produces a (0,k) run length limited code (with k=11 in the specific embodiment described above) readable with a low bit error rate in a storage system using a partial response read channel.

The above described variable rate coding and randomization technique produces a recorded bit stream which provides adequate amplitude and phase information during readback. With reference now to FIGS. 12–21, an advantageous read channel construction for reading the recorded bits will be described. It is one aspect of the present invention that gain, offset, and timing control are performed entirely in the digital domain.

Figure 12:
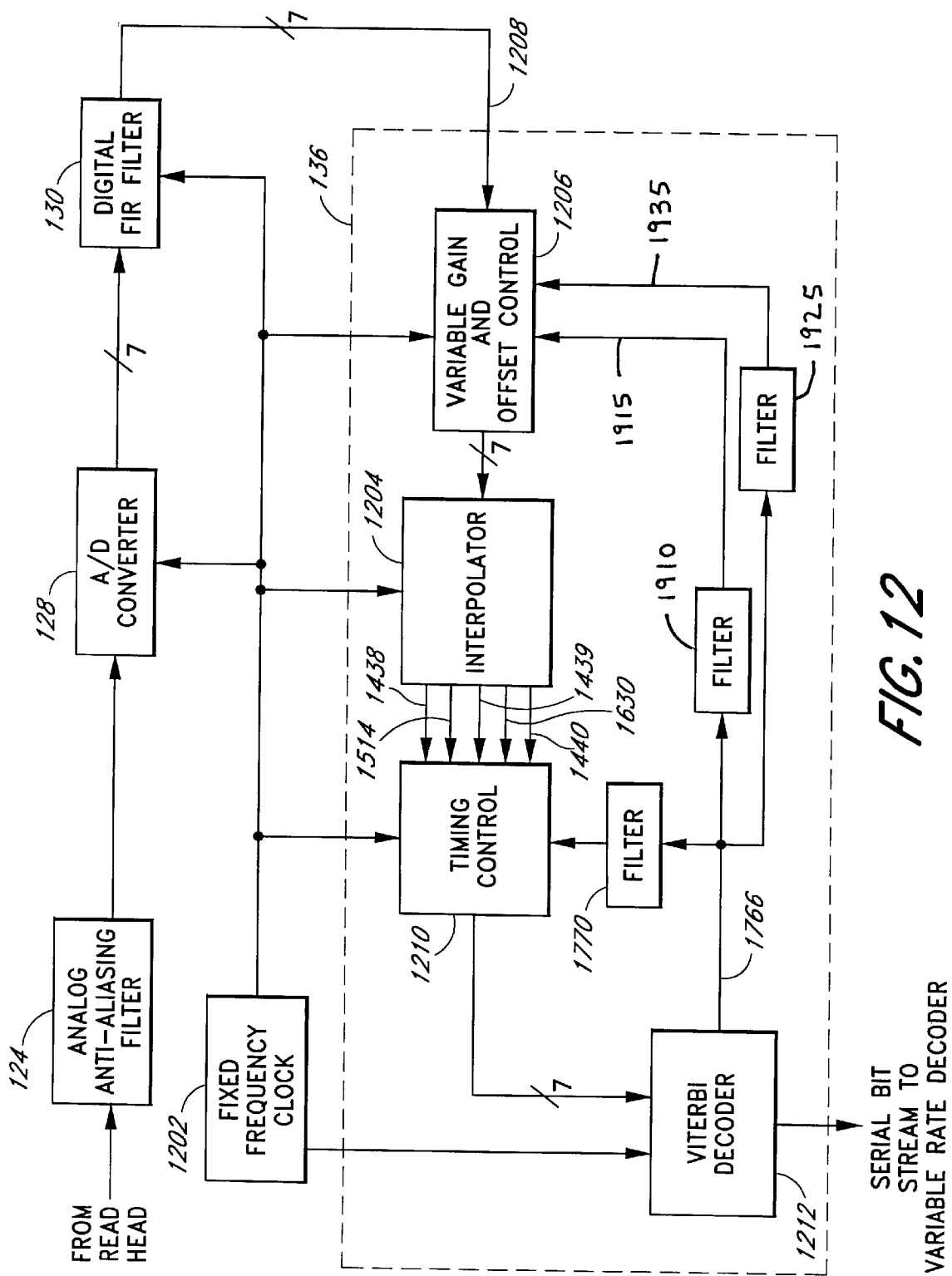
FIG. 12 is a block diagram of read signal gain and timing loops configured in accordance with a preferred embodiment of the present invention.

A block diagram of a circuit implementing such a scheme is illustrated in FIG. 12. This Figure illustrates one implementation of the sequence decoder 136 of FIG. 1. Referring now to this Figure, the signal from the read head is routed through an analog anti-aliasing filter 124 and sampled with an analog to digital converter 128 as illustrated in FIG. 1 as well. However, the sampling rate of the analog to digital converter 128 is controlled by a fixed frequency clock 1202, rather than the typical variable frequency voltage controlled oscillator (VCO). Because the sampling frequency and phase in this embodiment is fixed, samples of the read signal will not necessarily be taken at the points on the read waveform necessary for sequence decoding by the decoder 136. The read signal amplitude at the correctly timed points must therefore be recovered from the samples actually taken by the analog to digital converter 128. This function is performed in part by an interpolator 1204 which is described in further detail below with reference to FIGS. 14, 15, and 16.

To ensure that the sampled data points contain sufficient information to reconstruct the value of the read signal at points intermediate to the sampled points, the fixed sampling rate is preferably slightly greater than the Nyquist rate for the filtered read waveform input to the A/D converter 128. A fixed sampling rate of 1.25 times the nominal bit rate has been found suitable.

As also illustrated in FIG. 12, in one embodiment of the present invention the output of the FIR filter 130 is input to a digital variable gain and offset control circuit 1206. The gain and offset control circuit 1206 adds an offset correction and multiplies the filtered samples at node 1208 by a gain factor. The output of the digital gain and offset control circuit 1206 is input to the interpolator 1204 mentioned above. The interpolator 1204 outputs five values to a timing control circuit 1210 which calculates a reconstructed read signal amplitude based on the values received from the interpolator 1204. The process for producing this reconstructed read signal amplitude is described more fully below. Finally, this reconstructed read signal amplitude is fed to a Viterbi partial response decoder 1212, which interprets the reconstructed values to reproduce the originally recorded bit stream. The construction and operation of Viterbi partial response decoder circuitry is well known, and many variations are suitable for use with the invention. The retrieved bit stream is then routed to the variable rate decoder 142 for processing in accordance with the techniques described in detail above.

To illustrate the flow of data through the read channel of FIG. 12, a set of filtered samples which may be produced by reading the hypothetical bit sequence "0101110011000100" from the data storage media will be used as an example. This sample set, as well as intermediate amplitude values calculated by the circuit of FIG. 12 are shown in FIG. 13.

Figure 13:
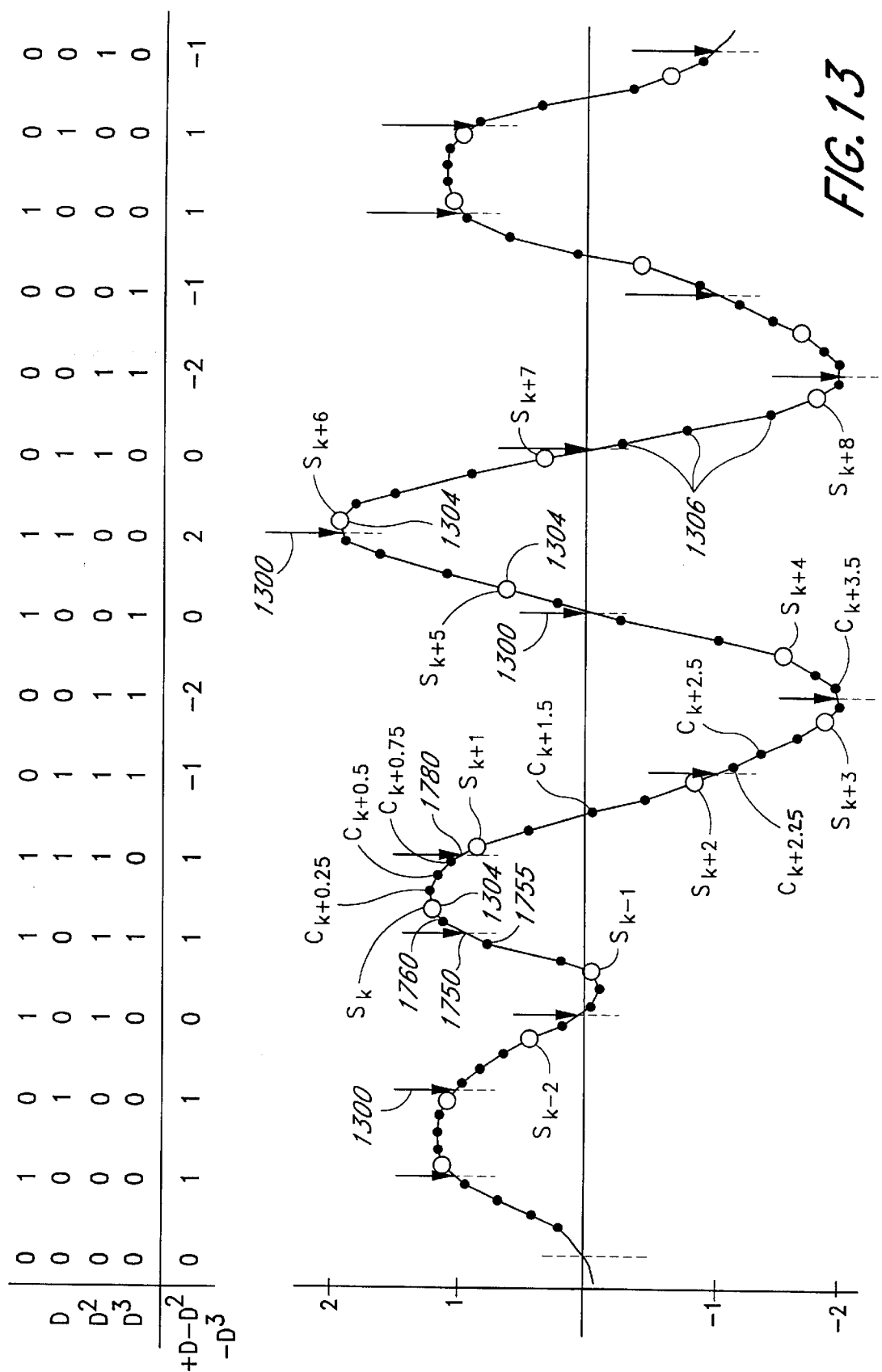
FIG. 13 is a graphical illustration of a sampled read signal after digital filtering produced by a hypothetical bit stream and the calculated read amplitudes generated from the filtered samples.

FIG. 13 thus illustrates an idealized, noise free, read signal sample set produced at node 1208 of FIG. 12 by the example bit sequence "0101110011000100" when filtered in accordance with an EPR4 spectral response, characterized by the polynomial $1+D-D^2-D^3$. Arrows 1300 illustrate the locations of properly timed sampling locations which fall on the five level eye pattern characteristic of EPR4 filtered read signals. Open circles 1304 represent filtered and gain adjusted sample values output by the digital gain control circuit 1206 and fed to the interpolator 1204 by a 7 bit (plus a sign bit) wide bus. It can be seen with examination of FIG. 13 that the sampled values output from the digital gain control circuit 1206 are not synchronized with properly timed sampling locations represented by the arrows 1300. In order to produce a reconstructed read signal amplitude at these properly timed locations 1300, the interpolator 1204 first arithmetically generates three intermediate amplitude values 1306 between each sample 1304 pair. In effect, the read waveform is recreated as a series of segments, each with two endpoints which comprise either a sampled value generated by the A/D converter, or a calculated value generated by the interpolator in response to a series of sampled values. In the discussion below, the following notation will be utilized: "$S_k$" denotes a given digitized waveform sample generated by the A/D converter, and input to the interpolator 1204. Prior and subsequent samples generated by the A/D converter for routing to the interpolator are referred to by incrementing the k subscript down or up respectively. For example, $S_{k+1}$ is the next sample value generated by the A/D converter after $S_k$. Similarly, $S_{k-1}$ is the sample value generated by the A/D converter just prior to the generation of $S_k$. Intermediate values calculated by the interpolator 1204 as described below are designated with a "C" rather than an S, and have fractional subscripts which are also referenced to a given $S_k$ sampled data point. For example, $C_{k-0.5}$ is a value calculated by the interpolator which approximates the value of the read signal at a midpoint between sampled values $S_{k-1}$ and $S_k$. Similarly, $C_{k+2.5}$ is a value calculated by the interpolator which approximates the value of the read signal at a midpoint between sampled values $S_{k+2}$ and $S_{k+3}$.

Referring now specifically to the sample pair denoted $S_k$ and $S_{k+1}$ of FIG. 13, the interpolator 1204 calculates a reconstruction of the filtered read signal amplitude $C_{k+0.5}$ at the midpoint between the two sampled values $S_k$ and $S_{k+1}$. The value of $C_{k+0.5}$ is calculated with the following formula, wherein $K_1$, $K_2$, and $K_3$ are programmable constants:

$$C_{k+0.5}=K_3(S_k+S_{k+1})-K_2(S_{k+2}+S_{k-1})+K_1(S_{k+3}+S_{k-2}) \quad (1)$$

Figure 14:
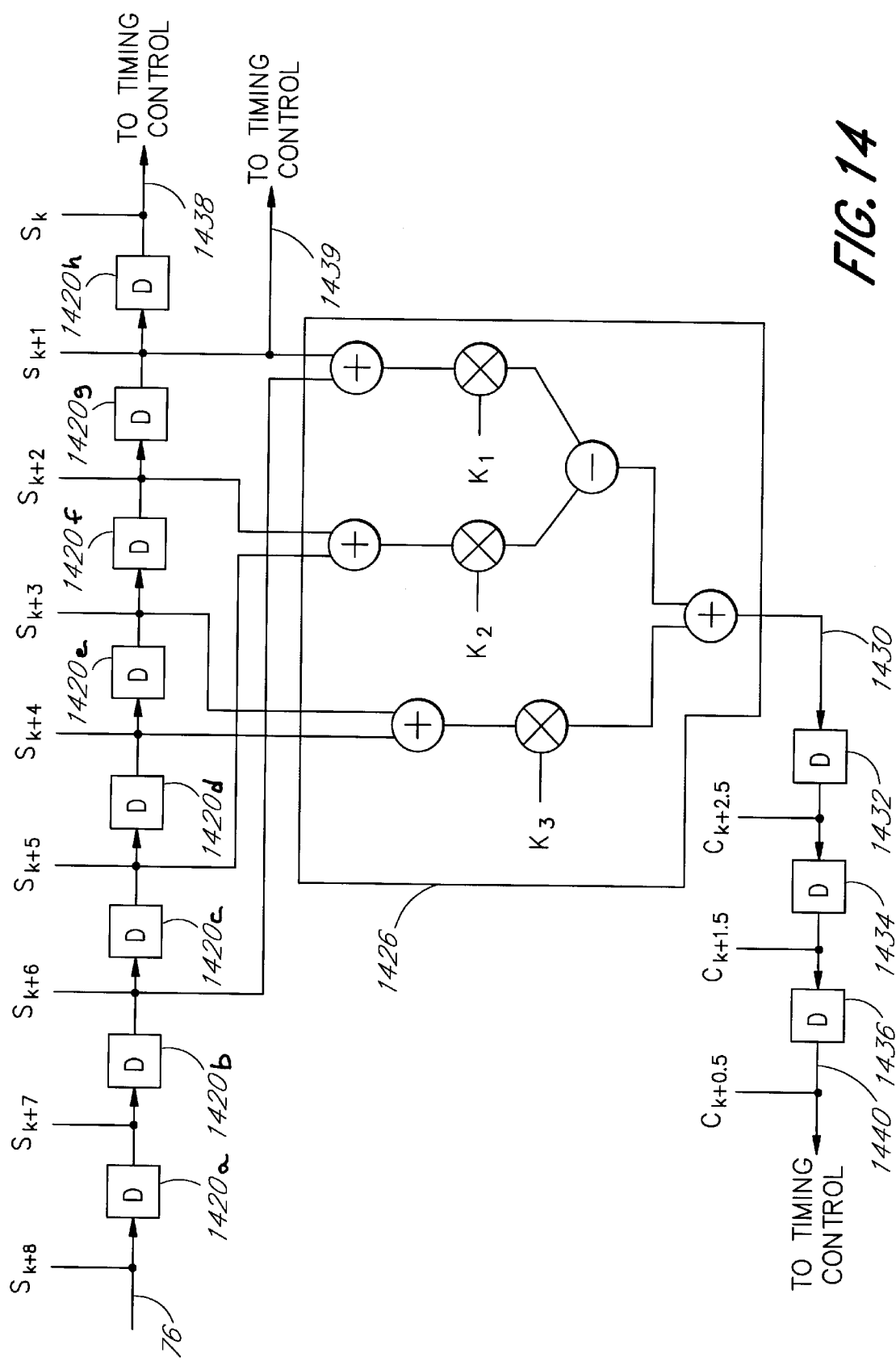
FIG. 14 is a block diagram of a circuit for calculating a read signal amplitude at a midpoint between first and second sampled read signal amplitudes.

One embodiment of hardware for implementing this calculation is illustrated in FIG. 14. The seven bit gain adjusted samples are fed from the gain control circuitry 1206 to the interpolator 1204 where they are shifted through a linear series of eight delay registers 1420a–1420h. The last two delay registers 1420g, 1420h in the series feed a first sampled value $S_k$ and the next following sampled value $S_{k+1}$ to the timing control circuit 1210 for further processing in a manner described in detail below.

When $S_k$ and $S_{k+1}$ are shifted out of registers 1420h and 1420g respectively, $S_{k+1}$ and the subsequently sampled values $S_{k+2}$, $S_{k+3}$, $S_{k+4}$, $S_{k+5}$, and $S_{k+6}$, are utilized to compute a reconstruction according to equation (1) above of the filtered read signal amplitude $C_{k+3.5}$ at the midpoint between the two sampled values $S_{k+3}$ and $S_{k+4}$. This calculation is performed by an arithmetic circuit 1426 which has the above mentioned $S_{k+1}$ through $S_{k+6}$ as inputs, and an output at node 1430 of FIG. 14 which comprises the result of the calculation of equation 1 above wherein the variable k is substituted with k+3. This result is fed to another series of three delay registers 1432, 1434, 1436. The last delay register 1436 of this series provides an output to the timing control circuit 1210 at node 1440 for further processing described in detail below. The numerical values for $K_1$, $K_2$, and $K_3$ can vary while still retaining acceptable interpolation. The values $K_1=0.04$, $K_2=0.14$, and $K_3=0.61$ have been found suitable.

It can be appreciated that the series of three delay registers between node 1430 at the output of the arithmetic circuit and the output at node 1440 to the timing control circuit results in the simultaneous transfer to the timing control circuit of two adjacent sample values (i.e. $S_k$ and $S_{k+1}$) and the calculated midpoint value (i.e. $C_{k+0.5}$) between those two adjacent sample values.

In addition to calculating reconstructed midpoints between filtered sample values, calculated values are also produced which represent read waveform values intermediate between each sampled value, $S_k$ and $S_{k+1}$, and their calculated midpoint amplitude $C_{k+0.5}$. The read amplitude of the midpoint between a first sampled value $S_k$ and the midpoint $C_{k+0.5}$ between this first sampled value and the next sampled value $S_{k+1}$ is calculated in accordance with the following formula:

$$C_{k+0.25} = K_4(S_{k+2} + C_{k+0.5}) + K_5(S_{k+1} + C_{k+1.5}) \qquad (2)$$

This calculated number is denoted herein as $C_{k+0.25}$ because it is the reconstructed read waveform amplitude at a position 25% of the way between a first sample $S_k$ and a subsequent sample $S_{k+1}$.

Similarly, the read amplitude of the midpoint between a second sampled value $S_{k+1}$ and the midpoint $C_{k+0.5}$ between this second sampled value and the previously sampled value $S_k$ is calculated in accordance with the following formula:

$$C_{k+0.75} = K_6(S_{k+1} + C_{k+2.5}) + K_7(S_{k+2} + C_{k+1.5}) \qquad (3)$$

This calculated number is denoted herein as $C_{k+0.75}$ because it is the reconstructed read waveform amplitude at a position 75% of the way between a first sample $S_k$ and a subsequent sample $S_{k+1}$. As with $K_1$, $K_2$, and $K_3$, the numerical values for $K_4$, $K_5$, $K_6$, and $K_7$ can vary while still retaining acceptable interpolation. Suitable values for these constants have been found to include $K_4 = K_6 = -0.07$, and $K_5 = K_7 = 0.57$.

Figure 15:
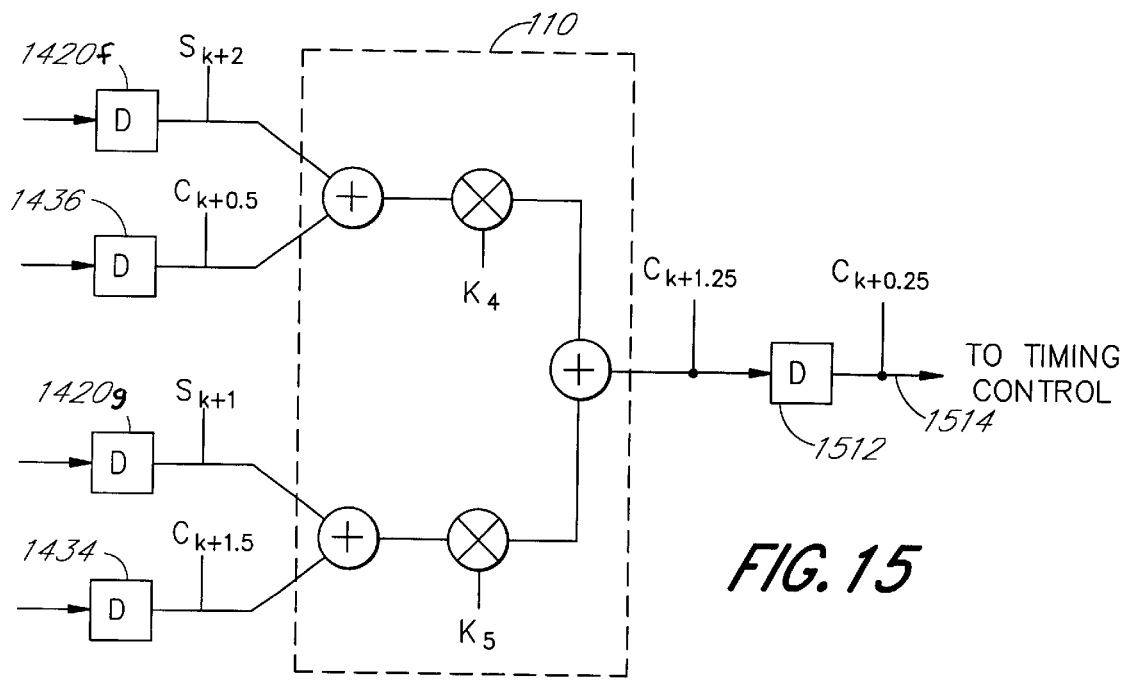
FIG. 15 is a block diagram of a circuit for calculating a read signal amplitude at a midpoint between the second sampled read signal amplitude and the overall calculated midpoint of FIG. 13.
Figure 16:
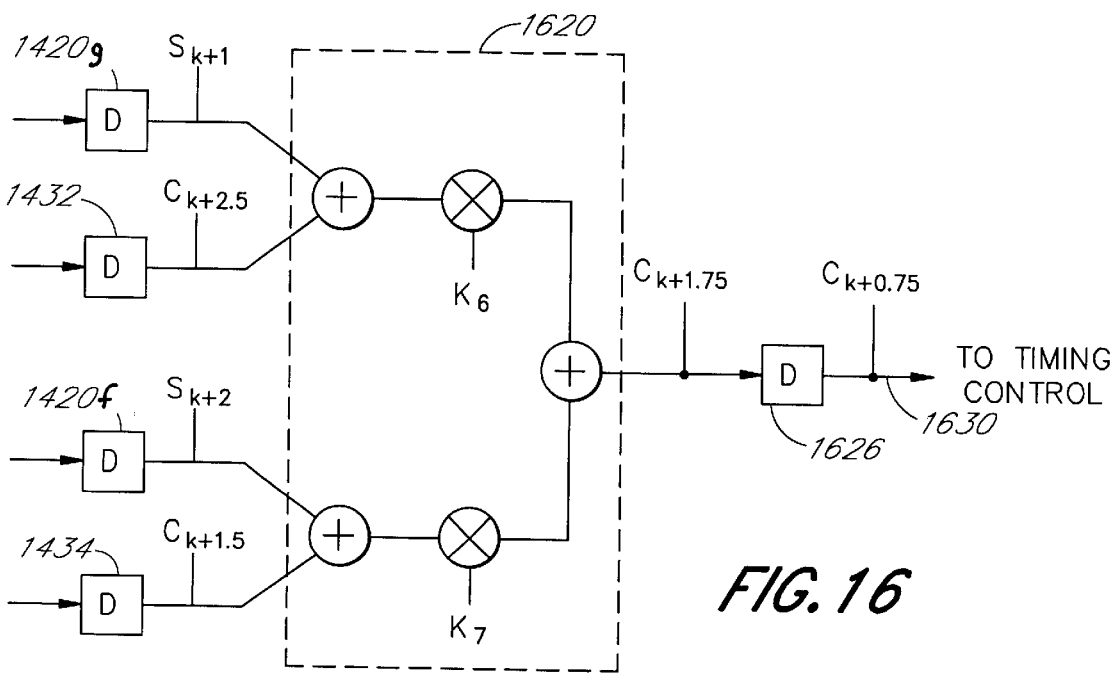
FIG. 16 is a block diagram of a circuit for calculating a read signal amplitude at a midpoint between the first sampled read signal amplitude and the overall calculated midpoint of FIG. 13.

Circuits for performing these calculations are illustrated in FIGS. 15 and 16. Illustrated in FIG. 15 is a preferred circuit for the calculation of the midpoint between a first sample value $S_{k+1}$ and the midpoint $C_{k+1.5}$ between this first sampled value and the next sampled value $S_{k+2}$, i.e. $C_{k+1.25}$. In the circuit illustrated in FIG. 15, the outputs of the delay registers 1420g, 1420f, 1434, and 1436 provide inputs to an arithmetic circuit 1510 which processes the values contained in these registers in accordance with equation (2) above, wherein k is substituted with k+1. The output of the arithmetic circuit 1510 comprising the calculated value $C_{k+1.25}$ is then input to a delay register 1512. This delay register further provides an output at node 1514 to the timing control circuit 1210.

Illustrated in FIG. 16 is a preferred circuit for the calculation of the midpoint between a first sample value $S_{k+2}$ and the midpoint $C_{k+1.5}$ between this first sampled value and the previously sampled value $S_{k+1}$, i.e. $C_{k+1.75}$. In the circuit illustrated in FIG. 16, the outputs of the delay registers 1420g, 1420f, 1432, and 1434 provide inputs to an arithmetic circuit 1620 which processes the values contained in these registers in accordance with equation (3) above. The output of the arithmetic circuit 1620 comprising the calculated $C_{k+1.75}$ is then input to another delay register 1626. This delay register further provides an output at node 1630 to the timing control circuit 1210.

It can again be appreciated that the simultaneously clocked delay registers 1512, 1626 between the outputs of the arithmetic circuits 1510, 1620 and the timing control circuit 1210 result in the simultaneous transfer to the timing control circuit of two adjacent sample values (i.e. $S_k$ and $S_{k+1}$), the calculated midpoint value (i.e. $C_{k+0.5}$), and the calculated 25% and 75% values (i.e. $C_{k+0.25}$ and $C_{k+0.75}$) between those two adjacent sample values. The timing control circuit 1210 therefore receives five values from the interpolator with each cycle of the clock 1202. At node 1438, it receives a filtered measured read amplitude sample value, $S_k$. At node 1440, it receives the subsequent filtered, measured read amplitude sample value, $S_{k+1}$. Calculated intermediate sample values $C_{k+0.25}$, $C_{k+0.5}$, and $C_{k+0.75}$ at 25%, 50%, and 75% between these two measured sample values are output to the timing control circuit at nodes 1514, 1439, and 1630 respectively. At the next clock transition, measured read sample $S_{k+1}$ is fed to the timing control circuit 1210 at node 1438, and subsequent measured read sample $S_{k+2}$ is fed to the timing control circuit 1210 at node 1440. Similarly, calculated intermediate sample values $C_{k+1.25}$, $C_{k+1.5}$, and $C_{k+1.75}$ at 25%, 50%, and 75% between these two measured sample values are output to the timing control circuit at nodes 1514, 1439, and 1630 respectively.

In one advantageous embodiment of the present invention, the precision of the interpolated value used for bit sequence, decoding is further increased by linearly approximating a waveform value in between selected ones of the sampled and calculated points described above. A block diagram of a circuit for performing this function is provided in FIG. 17.

Figure 17:
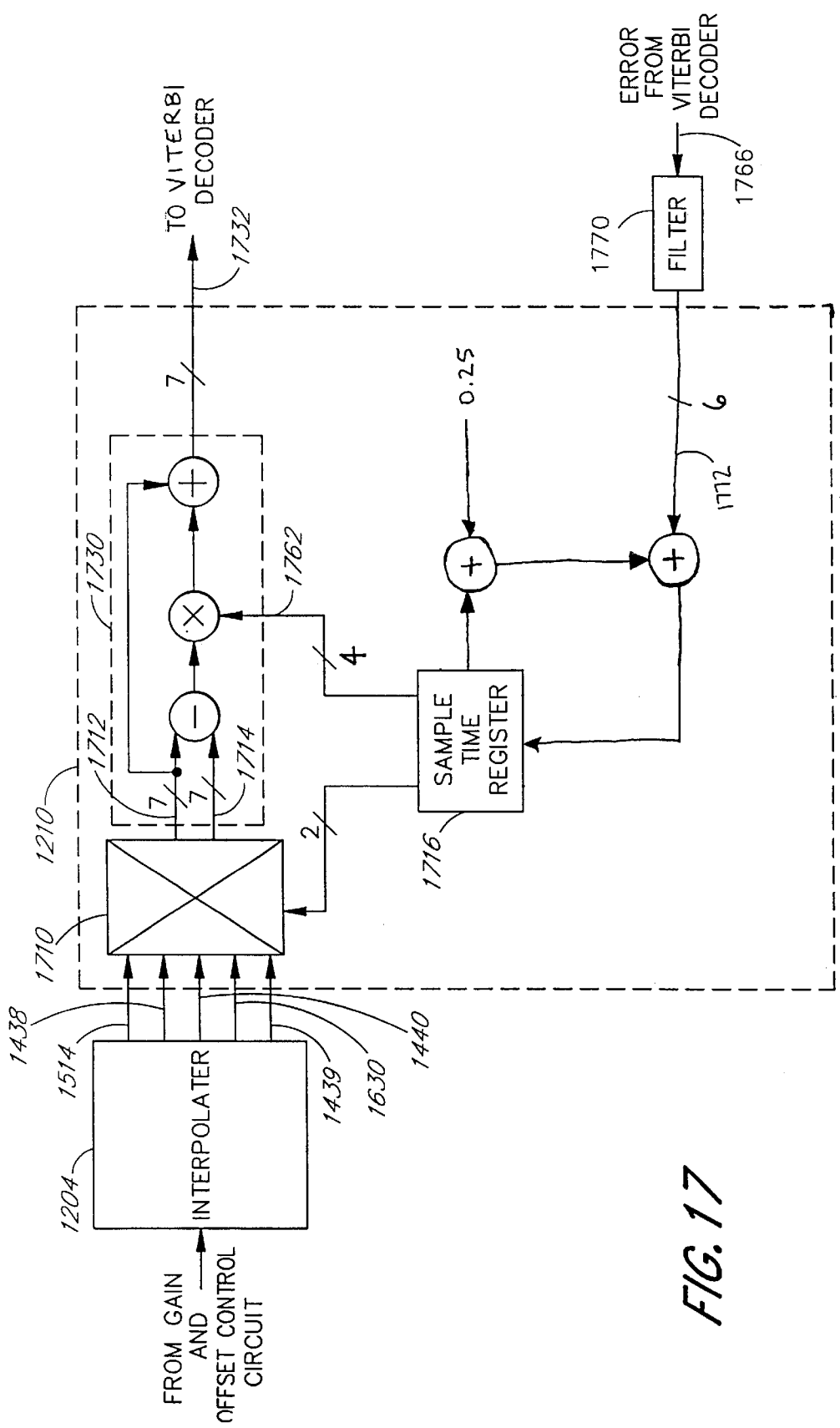
FIG. 17 is a block diagram of the timing control circuit of FIG. 12.

In FIG. 17, the interpolator 1204 is seen feeding the five seven bit words discussed above with reference to FIGS. 14, 15, and 16 to the timing control circuit 1210 as is also illustrated in FIG. 12. These five words are input to a multiplexer 1710, which has outputs at nodes 1712 and 1714. The multiplexer 1710 also has a control input from a sample time register 1716, which stores a six bit word representative of a fraction between 0 and 1. Specifically, the control input to the multiplexer 1710 comprises the two most significant bits of the sample time word stored in a sample time register 1716. Depending on the values of these two bits, the, multiplexer 1710 passes to lines 1712 and 1714 one of the four possible adjacent pairs of the five seven bit sampled and interpolated input words received from the interpolator 1204.

Referring back to FIG. 13 and points $S_k$ and $S_{k+1}$ for an illustrative example, a value of "00" for these two bits forces the multiplexer to shift out $S_k$ and $C_{k+0.25}$ at nodes 1712 and 1714, which are received by the multiplexer 1710 at nodes 1514 and 1438. A value of "01" for these bits forces the multiplexer 1710 to shift out $C_{k+0.25}$ and $C_{k+0.5}$, which are received by the multiplexer 1710 at nodes 1438 and 1440 respectively. Moving upward in a similar fashion, "10" causes an output of $C_{k+0.5}$ and $C_{k+0.75}$, and "11" causes an output of $C_{k+0.75}$ and $S_{k+1}$ at nodes 1712 and 1714 respectively. In effect, each increment of these two bits causes a shift upward of one waveform segment defined by its sampled or calculated endpoints.

The four least significant bits of the sample time word are utilized by an arithmetic estimation circuit 1730, which calculates the final seven bit estimated waveform magnitude from the two values received from the multiplexer 1710. This seven bit interpolated value is then fed to the Viterbi decoder 1212 at node 1732. The calculation performed by arithmetic circuit 1730 is preferably a linear estimation done by subtracting the two values received from the multiplexer 1710, and multiplying the difference by a constant determined by the four least significant bits of the sample time word. This value is then added back to the first of the two received values to produce an intermediate estimated value. These four least significant bits therefore represent the fraction between the two data points received at nodes 1712 and 1714 that lies nearest a properly timed sample.

The content of the sample time register at a given clock cycle is dependent on the prior sample time word, a constant update increment value, and the value of an error metric input to the timing control circuit 1210 from the Viterbi decoder. Referring back to FIG. 13, as well as to FIG. 17, the entire interpolation operation may be understood. In the sample waveform of FIG. 13, the properly timed read signal amplitude 1750 between A/D sampled values $S_{k-1}$ and $S_k$ is approximately halfway between $C_{k-0.5}$ (designated 1755 in FIG. 13) and $C_{k-0.25}$ (designated 1760 in FIG. 13). $C_{k-0.5}$ and $C_{k-0.25}$ are calculated by the interpolator circuit 1204 described above with reference to FIGS. 14 through 16. As discussed above, it is the value of the read waveform at this point 1750 that must be estimated and fed to the Viterbi decoder 1212.

Furthermore, this will be the location of the estimation produced by the circuit of FIG. 17 if the two bits feeding the multiplexer comprise "10" and the four bits fed to the linear estimation circuit result in a multiplier of 0.5. For illustration, we may assume that the sample time register 1716 is initially loaded with the appropriate value, and in response to the two most significant bits "01", calculated value 1755 received by the multiplexer 1710 at node 1440 is output to the arithmetic estimation circuit 1730 at node 1712. At the same time, interpolated value 1760, received by the multiplexer 1710 at node 1630, is also output to the arithmetic estimation circuit 1730 at node 1714.

Arithmetic estimation circuit 1730 then calculates an estimated value based on the formula:

$$(C_{k-0.5} - C_{k-0.25})(0.5) + C_{k-0.5}, \quad (2)$$

wherein the 0.5 multiplier was determined, as previously described, in response to the next four bits of the sample time word fed to the arithmetic estimation circuit 1730 from the sample time register 1716 at node 1762. This produces an estimated value 1750 which is fed to the Viterbi decoder at node 1732 as discussed above.

The Viterbi decoder receives this estimated value at node 1732, and also outputs an amplitude error value calculated from a prior received estimate value at node 1766 to a filter 1770 described in more detail below with reference to FIG. 18. The filter 1770 outputs an error metric at node 1772 which is used as one element to update the sample time register 1716. Assuming for this illustration that the estimated values being fed to the Viterbi decoder are properly timed, this error metric will be zero.

As shown in FIG. 17, the sample time word is usually updated by adding to it an update increment value 0.25 and the value of the error metric at node 1772. This sum is then stored back into the sample time register 1716. The effect of adding 0.25 to an initial sample time word is to increment the two bits determining which of the two values received by the multiplexer 1710 are output to the arithmetic estimation circuit 1730 at nodes 1712 and 1714.

Referring back now to FIG. 13, the interpolator 1204, at the next clock cycle, feeds $S_k$, $C_{k+0.25}$, $C_{k+0.5}$, $C_{k+0.75}$, and $S_{k+1}$ to the multiplexer 1710, and in response to the two most significant bits of the sample time word the multiplexer 1710 outputs $C_{k+0.75}$ and $S_{k+1}$ at nodes 1712 and 1714 respectively. Once again, the next four bits of the sample time word indicate a multiplier of 0.5 for the calculation of the estimated waveform magnitude between $C_{k+0.75}$ and $S_{k+1}$, producing the next properly timed estimated value 1780 (FIG. 13) which is output to the sequence decoder at node 1732.

It can be appreciated with examination of FIG. 13 that the region of the waveform with endpoints $S_{k+1}$ and $S_{k+2}$ contains no point coincident with a properly timed value to be fed to the sequence decoder. Accordingly, the next clock cycle, which results in the interpolator feeding the state machine with the five values of the waveform region having $S_{k+1}$ and $S_{k+2}$ as endpoints, should not result in a value being sent to the sequence decoder. This is caused by the 25% oversampling performed by the A/D converter discussed above which results in 5 samples being output from the A/D converter for every four which are to be sent to the bit decoder.

In this embodiment, the next update of the sample time word of 0.25 causes the sample time word to become greater than 1. In this event, the sample time word is not updated according to the path illustrated in FIG. 17. Instead, the outputs of the interpolator 1204 (which lie on and between $S_{k+1}$ and $S_{k+2}$ in FIG. 13) are ignored, and the sample time word is updated by subtracting 1 and the previously added error metric from the currently stored sample time word. In the next cycle, the two bits output to the multiplexer 1710 will cause the multiplexer, to pass $S_{k+2}$ and $C_{k+2.25}$. A 50% linear estimation between these points causes the next estimate of a properly timed sample to be forwarded to the Viterbi decoder. In this way, the 1.25 times oversampling of the A/D converter is eliminated, and four properly timed estimated magnitudes are shifted to the sequence decoder 36 for every five read waveform points sampled by the A/D converter.

In the above illustration, it was assumed that estimated values were properly timed, and the error metric utilized to correct timing errors introduced, for example, by tape ISV, remained zero. As described above, however, the timing error metric calculated by the filter 1770 adds to or subtracts from the 0.25 constant update increment value to correct for variations in bit rate caused by, for example, ISV.

As properly timed samples of the EPR4 waveform are expected to be plus or minus 1, 2, or 0, the seven bit estimated values fed to the sequence decoder are expected to be near one of these five values. With a seven bit resolution, the gain of the read channel is preferably adjusted so that the expected values to be received by the sequence decoder are decimal +64, +32, 0, −32, or −64. Timing errors, gain errors, and noise will cause the actual interpolated values received by the sequence decoder 136 to differ from these ideal values, and it is the difference between the received and expected values which is output at node 1766 and which is used to calculate the desired phase, gain and offset corrections. This amplitude error at node 1766 is filtered in three feedback loops for timing, gain, and offset control as described in FIGS. 18–20.

Figure 18:
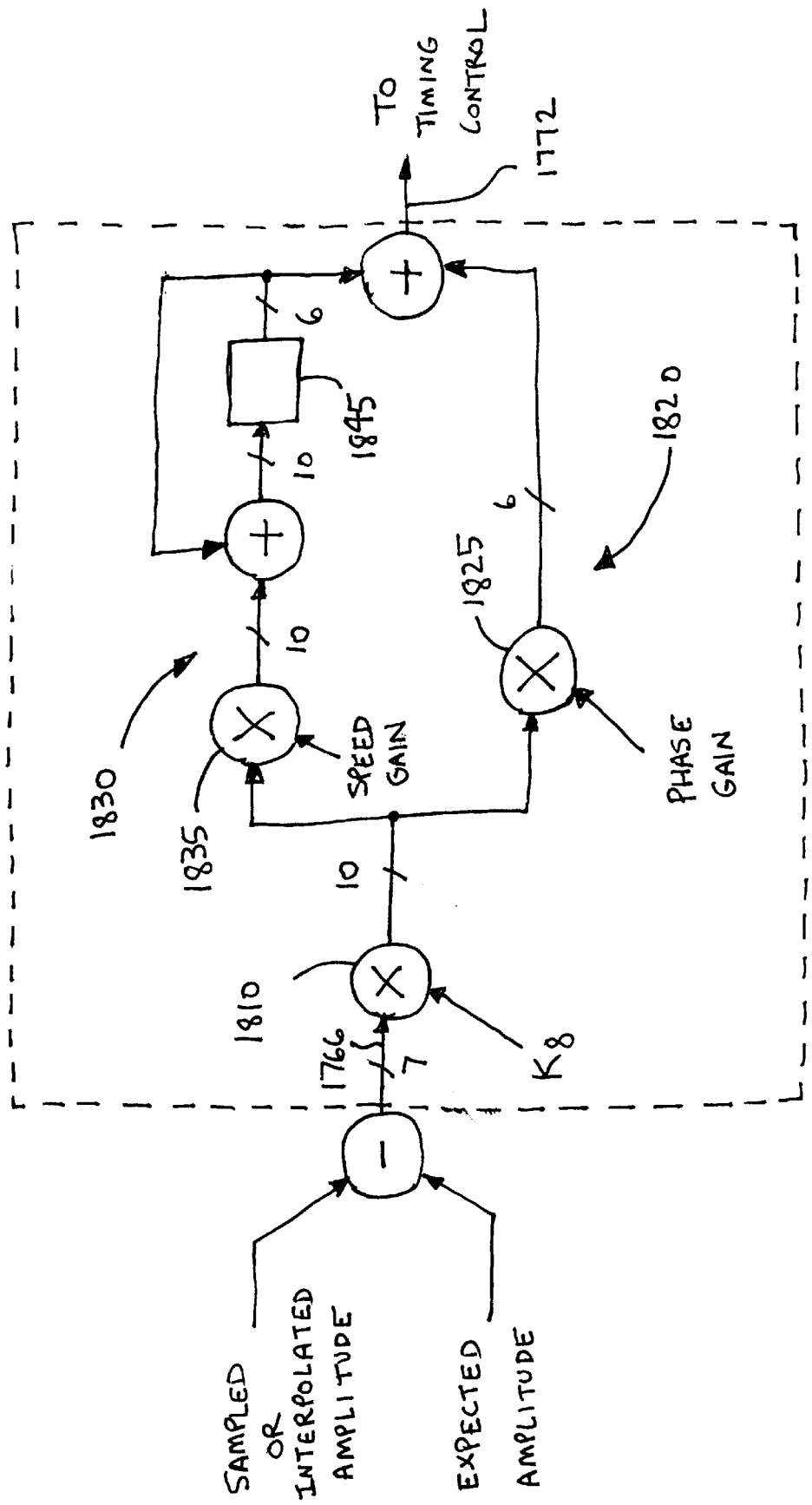
FIG. 18 is an illustration of the timing error filter circuit of FIG. 12.

Referring now to FIG. 18, each 7 bit resolution sampled or interpolated amplitude is subtracted from the appropriate expected values of either ±64, ±32, or 0 as determined by the Viterbi decoder 1212 during reconstruction of the bit sequence. The result of this calculation comprises the error output from the Viterbi decoder 1212 at node 1766. Filter circuit 1770 which receives this error output comprises a lead-lag filter network.

As an initial calculation, the filter 1770 multiplies the amplitude error at node 1766 by a value denoted $K_8$ in FIG. 18, which comprises an evaluation of the slope of the read signal at the sampling time. This value $K_8$ is calculated in the following manner. First, an integer is calculated using the five most recent decoded bits $d_0$ through $d_4$ using the formula:

$$3(d_0 + d_3) - 4(d_1 + d_2) + d_4$$

This formula will produce an integer which varies between +7 and −8, and in an EPR4 read channel, provides a value which tracks the slope of the read signal at the sampling point associated with the $d_0$ bit window. This +7 to −8 range is then clipped by assigning a value of ±4 to any value which exceeds ±4. For example, +5 becomes +4, −7 becomes −4, 2 remains 2, −3 remains −3, etc. If the result of this calculation is 0, +1, or −1, $K_8$ is set to 0. Otherwise, $K_8$ is this ±4 range result times −¼. $K_8$ is therefore ±0.25, ±0.5, ±0.75, or ±1. The result of the calculation performed by the multiplier 1810 is sent to speed and phase branches of the filter network.

In the phase branch 1820, the output of the multiplier 1810 is again multiplied by a phase gain by multiplier 1825 which may advantageously equal 1/16 during normal data read operations. The phase gain times the amplitude error forms a first component of a sum sent to the timing control circuit at node 1772.

In the speed branch 1830 of the filter 1770, the output of the multiplier 1810 is again multiplied by a speed gain by multiplier 1835. The speed gain may advantageously be set to 1/256 during normal data read operations. The result of this multiplication is added to the current content of a speed gain register 1845. To reduce noise, the arithmetic precision of the speed gain calculation is 10 bits, even though only the most significant 6 bits of the 10 are sent to the timing control circuit to update the content of the sample time register 1716. With each cycle, the speed gain register 1845 is updated by adding the current content of the register 1845 to the result of the multiplication performed by the multiplier 1835, and the six most significant bits of the current 10 bit value are routed out of the register 1845 to form the second portion of the sum sent to the timing control circuit at node 1772.

When the read channel is in acquisition mode and is attempting to obtain phase lock on a preamble sequence, many alternative initial phase and speed locking procedures are suitable and may be utilized with good results. In general, the phase and speed gains during acquisition will be larger (such as ¼ and 1/32 respectively for example) to close the loop at a faster rate when locking onto the large and characteristic read signal produced by a preamble sequence.

Figure 19:
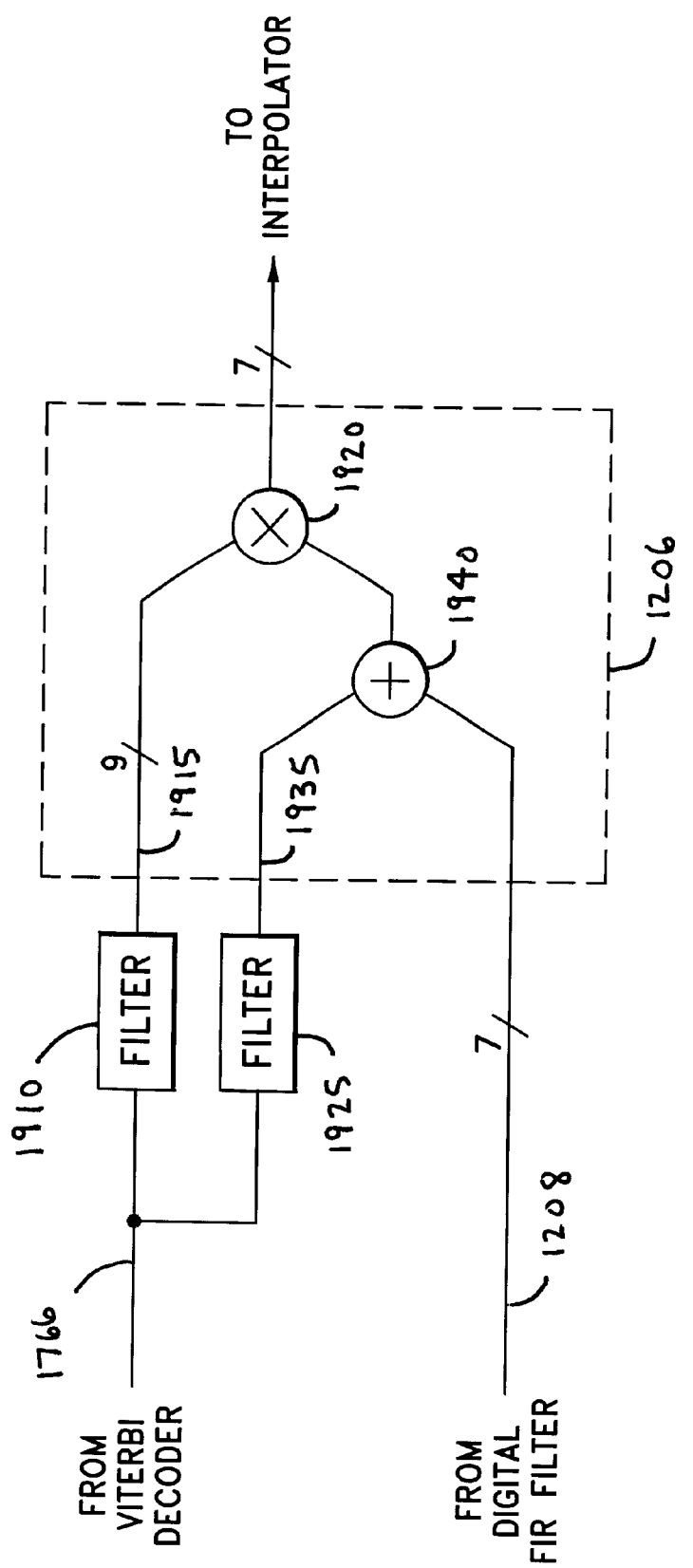
FIG. 19 is a block diagram of the gain and offset control circuit of FIG. 12.

As is illustrated in FIG. 19, gain and offset errors may also be corrected digitally. As with the timing error metric, the gain error metric is also calculated using the difference between the interpolated values received by the Viterbi decoder and the expected values produced by properly timed and amplified data samples. The difference between estimated and expected values is input to a gain error filter 1910 and an offset error filter 1925 (both also shown in FIG. 12). The filters 1910, 1925 produce outputs at nodes 1915 and 1935 respectively to the variable gain and offset control circuit 1206. The variable gain and offset control circuit 1206 includes a multiplier 1920 and an adder 1940. These circuits add the filtered offset error, to the sampled values from the FIR filter, and multiply each sample by a scale factor of 1 plus the gain error value output by the gain filter circuit 1910.

Figure 20:
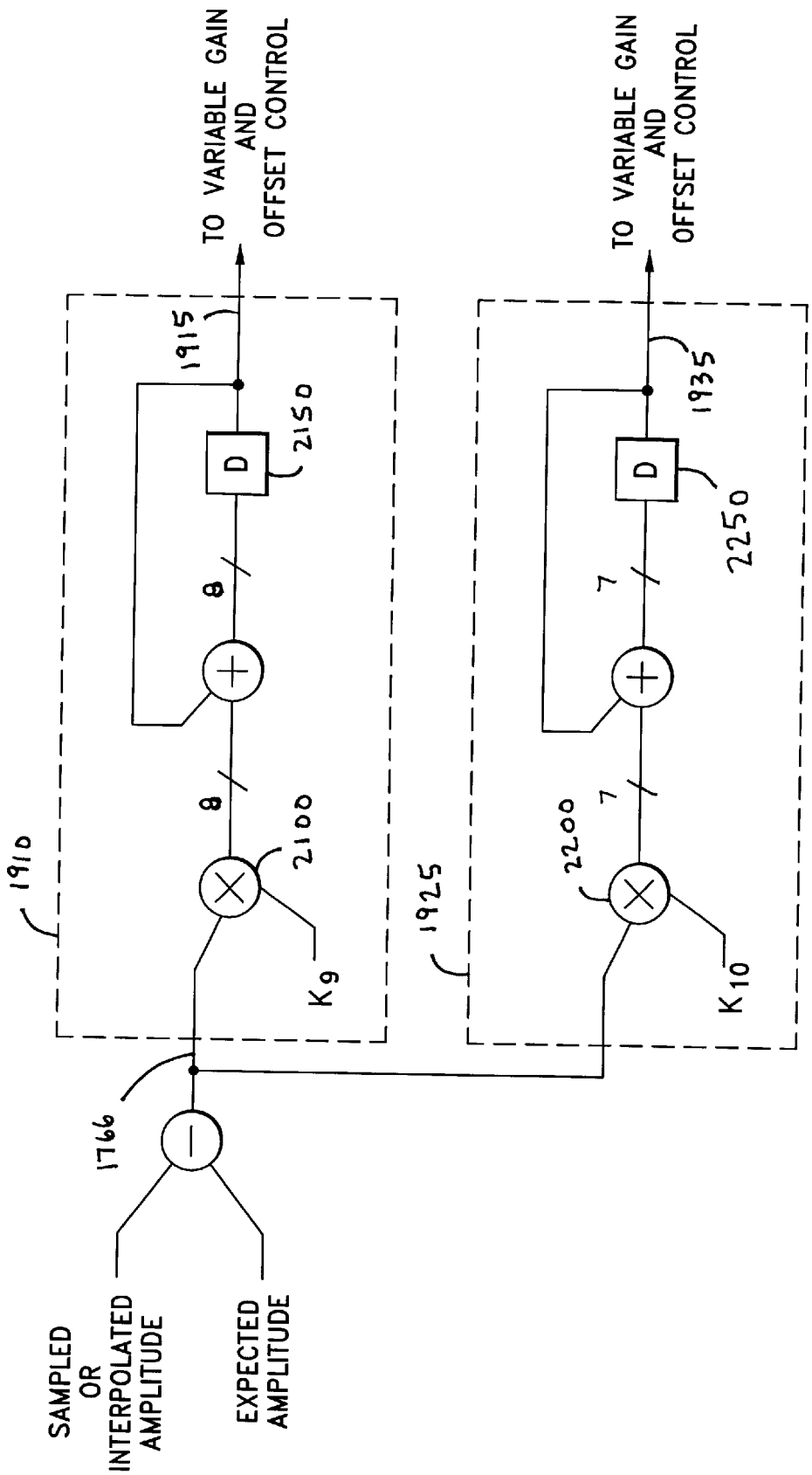
FIG. 20 is an illustration of the gain error and offset error filter circuits of FIG. 12.

Referring now to FIG. 20, an advantageous implementation of the gain and offset filters 1910, 1925 is set forth. The gain error filter 1910 may include a multiplier 2100, which multiplies the amplitude error value from the Viterbi decoder by a number denoted $K_9$ in FIG. 20. A $K_9$ of ⅛ for expected sample amplitudes of 1 and 2, and 0 for expected sample amplitudes of 0 has been found to be suitable. $K_9$ also will change in sign depending on the sign of the sample. The result of this multiplication is added to the previously calculated gain error and is stored in a gain error register 2150. Advantageously, 8 bit precision for these calculations provides suitable noise rejection and sufficiently inexpensive circuit implementation.

The offset error filter 1925 is also illustrated in FIG. 20, and may similarly include a multiplier 2200 which multiplies the error value from the Viterbi decoder at node 1766 by a number denoted $K_{10}$ in FIG. 20. Suitable values for $K_{10}$ include ⅛ or 1/16. As in the timing and gain filters, the result of this calculation is added to the previously calculated error metric and is stored in an offset error register 2250. Advantageously, 7 bit precision for these calculations provides suitable noise rejection and sufficiently inexpensive circuit implementation.

A digital data recording channel as set forth above therefore provides a PRML read channel with all digital timing, gain, and offset feedback loops. These features may be coupled with an efficient (0,k) run length limited write format to provide high density data storage.

The foregoing description details certain preferred embodiments of the present invention and describes the best mode contemplated. It will be appreciated, however, that no matter how detailed the foregoing appears in text, the invention can be practiced in many ways and the invention should be construed in accordance with the appended claims and any equivalents thereof.

What is claimed is:

1. A tape drive for storing data on magnetic tape comprising:

write electronics including a variable rate encoder, wherein said variable rate encoder is configured to insert bits into a received data stream at a rate which depends on the content of said data stream, wherein a length of said data stream is increased different amounts depending on the content of said data stream;

a write head for writing said data stream including said inserted bits to linear tracks on a magnetic tape;

read electronics for reading said data stream from said magnetic tape, said read electronics comprising a digital timing feedback loop for maintaining phase lock with said data stream during said reading.

2. The tape drive of claim 1, wherein said variable rate encoder satisfies a (0,k) run length limited code constraint.

3. The tape drive of claim 2, wherein said read electronics comprises a partial response bit decoder.

4. The tape drive of claim 1, wherein said read electronics additionally comprises digital gain feedback loop.

5. The tape drive of claim 1, wherein said variable rate encoder comprises a data randomizer.

6. A tape drive for storing data on magnetic tape comprising:

write electronics including a variable rate encoder, wherein said variable rate encoder is configured to insert bits into a received data stream at a rate which depends on the content of said data stream, and wherein said variable rate encoder comprises a data randomizer configured to randomize different blocks of data with different non-deterministically selected randomizer seeds;

a write head for writing said data stream including said inserted bits to linear tracks on a magnetic tape;

read electronics for reading said data stream from said magnetic tape, said read electronics comprising a digital timing feedback loop for maintaining phase lock with said data stream during said reading.

\* \* \* \* \*